(12) United States Patent
Zhao

(10) Patent No.: US 8,812,435 B1
(45) Date of Patent: Aug. 19, 2014

(54) LEARNING OBJECTS AND FACTS FROM DOCUMENTS

(75) Inventor: Shubin Zhao, Jersey City, NJ (US)

(73) Assignee: Google Inc., Mountain View, CA (US)

( * ) Notice: Subject to any disclaimer, the term of this patent is extended or adjusted under 35 U.S.C. 154(b) by 105 days.

(21) Appl. No.: 11/941,382

(22) Filed: Nov. 16, 2007

(51) Int. Cl.
*G06F 7/00* (2006.01)

(52) U.S. Cl.
USPC .......................................... 707/603; 706/45

(58) Field of Classification Search
USPC ..................................... 707/811, 603; 706/45
See application file for complete search history.

(56) References Cited

U.S. PATENT DOCUMENTS

| | | | |
|---|---|---|---|
| 5,010,478 A | 4/1991 | Deran | 364/200 |
| 5,133,075 A | 7/1992 | Risch | 395/800 |
| 5,347,653 A | 9/1994 | Flynn et al. | |
| 5,440,730 A | 8/1995 | Elmasri et al. | |
| 5,475,819 A | 12/1995 | Miller et al. | 395/200.03 |
| 5,519,608 A | 5/1996 | Kupiec | 364/419.08 |
| 5,546,507 A | 8/1996 | Staub | |
| 5,560,005 A | 9/1996 | Hoover et al. | 395/600 |
| 5,574,898 A | 11/1996 | Leblang et al. | 395/601 |
| 5,675,785 A | 10/1997 | Hall et al. | |
| 5,680,622 A | 10/1997 | Even | |
| 5,694,590 A | 12/1997 | Thuraisingham et al. | 395/600 |
| 5,701,470 A | 12/1997 | Joy et al. | |
| 5,717,911 A | 2/1998 | Madrid et al. | 395/602 |
| 5,717,951 A | 2/1998 | Yabumoto | 395/831 |
| 5,724,571 A | 3/1998 | Woods | |
| 5,778,373 A | 7/1998 | Levy et al. | 707/100 |
| 5,778,378 A | 7/1998 | Rubin | 707/103 |
| 5,787,413 A | 7/1998 | Kauffman et al. | 707/2 |
| 5,793,966 A | 8/1998 | Amstein et al. | 395/200.33 |
| 5,802,299 A | 9/1998 | Logan et al. | 395/200.48 |
| 5,815,415 A | 9/1998 | Bentley et al. | |
| 5,819,210 A | 10/1998 | Maxwell, III et al. | 704/9 |
| 5,819,265 A | 10/1998 | Ravin et al. | |
| 5,822,743 A | 10/1998 | Gupta et al. | |
| 5,838,979 A | 11/1998 | Hart et al. | |
| 5,909,689 A | 6/1999 | Van Ryzin | |

(Continued)

FOREIGN PATENT DOCUMENTS

| | | |
|---|---|---|
| JP | 5-174020 | 7/1993 |
| JP | 11-265400 | 9/1999 |

(Continued)

OTHER PUBLICATIONS

Zhao et al., Corroborate and Learn Facts from the Web, Aug. 2007, AMC.*

(Continued)

*Primary Examiner* — James Trujillo
*Assistant Examiner* — Dawaune Conyers
(74) *Attorney, Agent, or Firm* — Morgan, Lewis & Bockius LLP

(57) ABSTRACT

A system, method, and computer program product for learning objects and facts from documents. A source object and a source document are selected and a title pattern and a contextual pattern are identified based on the source object and the source document. A set of documents matching the title pattern and the contextual pattern are selected. For each document in the selected set, a name and one or more facts are identified by applying the title pattern and the contextual pattern to the document. Objects are identified or created based on the identified names and associated with the identified facts.

20 Claims, 9 Drawing Sheets

(56) References Cited

U.S. PATENT DOCUMENTS

| | | |
|---|---|---|
| 5,920,859 A | 7/1999 | Li .................... 707/5 |
| 5,943,670 A | 8/1999 | Prager ................ 707/5 |
| 5,956,718 A | 9/1999 | Prasad et al. ........... 707/10 |
| 5,974,254 A | 10/1999 | Hsu |
| 5,987,460 A | 11/1999 | Niwa et al. ............ 707/6 |
| 6,006,221 A | 12/1999 | Liddy et al. ........... 707/5 |
| 6,018,741 A | 1/2000 | Howland et al. |
| 6,038,560 A | 3/2000 | Wical ................. 707/5 |
| 6,044,366 A | 3/2000 | Graffe et al. .......... 707/2 |
| 6,052,693 A | 4/2000 | Smith et al. ........... 707/104 |
| 6,064,952 A | 5/2000 | Imanaka et al. ......... 704/9 |
| 6,073,130 A | 6/2000 | Jacobson et al. ........ 707/5 |
| 6,078,918 A | 6/2000 | Allen et al. |
| 6,112,203 A | 8/2000 | Bharat et al. .......... 707/5 |
| 6,112,210 A | 8/2000 | Nori et al. |
| 6,122,647 A | 9/2000 | Horowitz et al. ....... 707/513 |
| 6,134,555 A | 10/2000 | Chadha et al. ......... 707/102 |
| 6,138,270 A | 10/2000 | Hsu |
| 6,182,063 B1 | 1/2001 | Woods |
| 6,202,065 B1 | 3/2001 | Wills ................. 707/5 |
| 6,212,526 B1 | 4/2001 | Chaudhuri et al. ...... 707/102 |
| 6,240,546 B1 | 5/2001 | Lee et al. ............ 717/4 |
| 6,263,328 B1 | 7/2001 | Coden et al. .......... 707/3 |
| 6,263,358 B1 | 7/2001 | Lee et al. |
| 6,266,805 B1 | 7/2001 | Nwana et al. |
| 6,285,999 B1 | 9/2001 | Page .................. 707/5 |
| 6,289,338 B1 | 9/2001 | Stoffel et al. ......... 707/3 |
| 6,311,194 B1 | 10/2001 | Sheth et al. .......... 707/505 |
| 6,314,555 B1 | 11/2001 | Ndumu et al. |
| 6,327,574 B1 | 12/2001 | Kramer et al. ......... 705/14 |
| 6,349,275 B1 | 2/2002 | Schumacher et al. ..... 704/8 |
| 6,377,943 B1 | 4/2002 | Jakobsson ............. 707/2 |
| 6,397,228 B1 | 5/2002 | Lamburt et al. |
| 6,438,543 B1 | 8/2002 | Kazi et al. |
| 6,470,330 B1 | 10/2002 | Das et al. |
| 6,473,898 B1 | 10/2002 | Waugh et al. .......... 717/168 |
| 6,487,495 B1 | 11/2002 | Gale et al. ........... 701/209 |
| 6,502,102 B1 | 12/2002 | Haswell et al. ........ 707/102 |
| 6,519,631 B1 | 2/2003 | Rosenschein et al. .... 709/217 |
| 6,556,991 B1 | 4/2003 | Borkovsky |
| 6,565,610 B1 | 5/2003 | Wang et al. |
| 6,567,846 B1 | 5/2003 | Garg et al. ........... 709/218 |
| 6,567,936 B1 | 5/2003 | Yang et al. ........... 714/37 |
| 6,572,661 B1 | 6/2003 | Stern ................. 715/501.1 |
| 6,578,032 B1 | 6/2003 | Chandrasekar et al. |
| 6,584,464 B1 | 6/2003 | Warthen ............... 707/4 |
| 6,584,646 B2 | 7/2003 | Fujita |
| 6,594,658 B2 | 7/2003 | Woods |
| 6,606,625 B1 | 8/2003 | Muslea et al. ......... 707/6 |
| 6,606,659 B1 | 8/2003 | Hegli et al. .......... 709/225 |
| 6,609,123 B1 | 8/2003 | Cazemier et al. ....... 707/3 |
| 6,636,742 B1 | 10/2003 | Torkki et al. |
| 6,643,641 B1 | 11/2003 | Snyder ................ 707/4 |
| 6,665,659 B1 | 12/2003 | Logan ................. 707/3 |
| 6,665,666 B1 | 12/2003 | Brown et al. .......... 707/5 |
| 6,665,837 B1 | 12/2003 | Dean et al. ........... 715/501.1 |
| 6,675,159 B1 | 1/2004 | Lin et al. |
| 6,684,205 B1 | 1/2004 | Modha et al. |
| 6,693,651 B2 | 2/2004 | Biebesheimer et al. ... 345/837 |
| 6,704,726 B1 | 3/2004 | Amouroux ............. 707/4 |
| 6,738,767 B1 | 5/2004 | Chung et al. .......... 707/7 |
| 6,745,189 B2 | 6/2004 | Schreiber |
| 6,754,873 B1 | 6/2004 | Law et al. ............ 715/501.1 |
| 6,763,496 B1 | 7/2004 | Hennings et al. |
| 6,799,176 B1 | 9/2004 | Page .................. 707/5 |
| 6,804,667 B1 | 10/2004 | Martin ................ 707/6 |
| 6,820,081 B1 | 11/2004 | Kawai et al. |
| 6,820,093 B2 | 11/2004 | de la Huerga |
| 6,823,495 B1 | 11/2004 | Vedula et al. ......... 715/805 |
| 6,832,218 B1 | 12/2004 | Emens et al. .......... 707/3 |
| 6,845,354 B1 | 1/2005 | Kuo et al. ............ 704/9 |
| 6,850,896 B1 | 2/2005 | Kelman et al. ......... 705/10 |
| 6,868,411 B2 | 3/2005 | Shanahan |
| 6,873,982 B1 | 3/2005 | Bates et al. .......... 707/5 |
| 6,873,993 B2 | 3/2005 | Charlesworth et al. |
| 6,886,005 B2 | 4/2005 | Davis ................. 707/2 |
| 6,886,010 B2 | 4/2005 | Kostoff ............... 707/3 |
| 6,901,403 B1 | 5/2005 | Bata et al. ........... 707/101 |
| 6,904,429 B2 | 6/2005 | Sako et al. ........... 707/3 |
| 6,957,213 B1 | 10/2005 | Yuret ................. 707/4 |
| 6,963,880 B1 | 11/2005 | Pingte et al. ......... 707/103 |
| 6,965,900 B2 | 11/2005 | Srinivasa et al. ...... 707/102 |
| 7,003,506 B1 | 2/2006 | Fisk et al. ........... 707/1 |
| 7,003,522 B1 | 2/2006 | Reynar et al. ......... 707/10 |
| 7,003,719 B1 | 2/2006 | Rosenoff et al. ....... 715/500.1 |
| 7,007,228 B1 | 2/2006 | Carro ................. 715/513 |
| 7,013,308 B1 | 3/2006 | Tunstall-Pedoe ........ 707/104.1 |
| 7,020,662 B2 | 3/2006 | Boreham et al. ........ 707/104.1 |
| 7,043,521 B2 | 5/2006 | Eitel ................. 709/202 |
| 7,051,023 B2 | 5/2006 | Kapur et al. .......... 707/5 |
| 7,076,491 B2 | 7/2006 | Tsao .................. 707/100 |
| 7,080,073 B1 | 7/2006 | Jiang et al. .......... 707/7 |
| 7,080,085 B1 | 7/2006 | Choy et al. ........... 707/101 |
| 7,100,082 B2 | 8/2006 | Little et al. |
| 7,143,099 B2 | 11/2006 | Lecheler-Moore et al. .. 707/101 |
| 7,146,536 B2 | 12/2006 | Bingham et al. ........ 714/26 |
| 7,158,980 B2 | 1/2007 | Shen .................. 707/100 |
| 7,162,499 B2 | 1/2007 | Lees et al. ........... 707/203 |
| 7,165,024 B2 | 1/2007 | Glover et al. ......... 704/9 |
| 7,174,504 B2 | 2/2007 | Tsao .................. 715/503 |
| 7,181,471 B1 | 2/2007 | Ibuki et al. .......... 707/201 |
| 7,194,380 B2 | 3/2007 | Barrow et al. ......... 702/181 |
| 7,197,449 B2 | 3/2007 | Hu et al. |
| 7,216,073 B2 | 5/2007 | Lavi et al. ........... 704/9 |
| 7,233,943 B2 | 6/2007 | Modha et al. |
| 7,260,573 B1 | 8/2007 | Jeh et al. |
| 7,263,565 B2 | 8/2007 | Tawara et al. |
| 7,277,879 B2 | 10/2007 | Varadarajan ........... 707/1 |
| 7,302,646 B2 | 11/2007 | Nomiyama et al. ....... 715/764 |
| 7,305,380 B1 | 12/2007 | Hoelzle et al. ........ 707/3 |
| 7,325,160 B2 | 1/2008 | Tsao .................. 714/15 |
| 7,363,312 B2 | 4/2008 | Goldsack .............. 707/102 |
| 7,376,895 B2 | 5/2008 | Tsao .................. 715/517 |
| 7,398,461 B1 | 7/2008 | Broder et al. |
| 7,409,381 B1 | 8/2008 | Steel et al. .......... 707/3 |
| 7,412,078 B2 | 8/2008 | Kim |
| 7,418,736 B2 | 8/2008 | Ghanea-Hercock |
| 7,472,182 B1 | 12/2008 | Young et al. |
| 7,483,829 B2 | 1/2009 | Murakami et al. |
| 7,493,308 B1 | 2/2009 | Bair, Jr. et al. ...... 707/3 |
| 7,493,317 B2 | 2/2009 | Geva .................. 707/3 |
| 7,587,387 B2 | 9/2009 | Hogue ................. 707/3 |
| 7,644,076 B1 | 1/2010 | Ramesh et al. |
| 7,672,971 B2 | 3/2010 | Betz et al. ........... 707/103 |
| 7,685,201 B2 | 3/2010 | Zeng et al. |
| 7,698,303 B2 | 4/2010 | Goodwin et al. |
| 7,716,225 B1 | 5/2010 | Dean et al. |
| 7,747,571 B2 | 6/2010 | Boggs |
| 7,756,823 B2 | 7/2010 | Young et al. |
| 7,797,282 B1 | 9/2010 | Kirshenbaum et al. |
| 7,885,918 B2 | 2/2011 | Statchuk |
| 7,917,154 B2 | 3/2011 | Fortescue et al. |
| 7,953,720 B1 | 5/2011 | Rohde et al. |
| 8,024,281 B2 | 9/2011 | Proctor et al. |
| 8,065,290 B2 | 11/2011 | Hogue |
| 8,108,501 B2 | 1/2012 | Birnie et al. |
| 2001/0021935 A1 | 9/2001 | Mills ................. 707/513 |
| 2002/0022956 A1 | 2/2002 | Ukrainczyk et al. |
| 2002/0038307 A1 | 3/2002 | Obradovic et al. ...... 707/102 |
| 2002/0042707 A1 | 4/2002 | Zhao et al. ........... 704/9 |
| 2002/0065845 A1 | 5/2002 | Naito et al. .......... 707/500.1 |
| 2002/0073115 A1 | 6/2002 | Davis ................. 707/500.1 |
| 2002/0083039 A1 | 6/2002 | Ferrari et al. ........ 707/1 |
| 2002/0087567 A1 | 7/2002 | Spiegler et al. ....... 707/100 |
| 2002/0107861 A1 | 8/2002 | Clendinning et al. .... 707/101 |
| 2002/0147738 A1 | 10/2002 | Reader |
| 2002/0169770 A1 | 11/2002 | Kim et al. ............ 707/5 |
| 2002/0174099 A1 | 11/2002 | Raj et al. ............ 707/1 |
| 2002/0178448 A1 | 11/2002 | Te Kiefte et al. ...... 725/46 |
| 2002/0194172 A1 | 12/2002 | Schreiber ............. 707/4 |
| 2003/0018652 A1 | 1/2003 | Heckerman et al. ...... 707/104.1 |
| 2003/0058706 A1 | 3/2003 | Okamoto et al. ........ 365/200 |
| 2003/0069880 A1 | 4/2003 | Harrison et al. ....... 707/3 |
| 2003/0078902 A1 | 4/2003 | Leong et al. .......... 706/59 |

(56) References Cited

U.S. PATENT DOCUMENTS

| | | |
|---|---|---|
| 2003/0088607 A1 | 5/2003 | Ruellan et al. |
| 2003/0097357 A1 | 5/2003 | Ferrari et al. .................... 707/3 |
| 2003/0120644 A1 | 6/2003 | Shirota |
| 2003/0120675 A1 | 6/2003 | Stauber et al. ................ 707/100 |
| 2003/0126102 A1 | 7/2003 | Borthwick |
| 2003/0126152 A1 | 7/2003 | Rajak ........................... 707/101 |
| 2003/0149567 A1 | 8/2003 | Schmitz et al. ............... 704/270 |
| 2003/0149699 A1 | 8/2003 | Tsao ............................. 707/100 |
| 2003/0154071 A1 | 8/2003 | Shreve ............................. 704/9 |
| 2003/0167163 A1 | 9/2003 | Glover et al. |
| 2003/0177110 A1 | 9/2003 | Okamoto et al. ................ 707/3 |
| 2003/0182310 A1 | 9/2003 | Charnock et al. ......... 707/104.1 |
| 2003/0195872 A1 | 10/2003 | Senn ................................ 707/3 |
| 2003/0195877 A1 | 10/2003 | Ford et al. ........................ 707/3 |
| 2003/0196052 A1 | 10/2003 | Bolik et al. |
| 2003/0204481 A1 | 10/2003 | Lau |
| 2003/0208354 A1 | 11/2003 | Lin et al. |
| 2004/0003067 A1 | 1/2004 | Ferrin ........................... 709/223 |
| 2004/0015481 A1 | 1/2004 | Zinda |
| 2004/0024739 A1 | 2/2004 | Copperman et al. .............. 707/1 |
| 2004/0049503 A1 | 3/2004 | Modha et al. |
| 2004/0059726 A1* | 3/2004 | Hunter et al. ..................... 707/3 |
| 2004/0064447 A1 | 4/2004 | Simske et al. |
| 2004/0069880 A1 | 4/2004 | Samelson et al. ............... 241/74 |
| 2004/0088292 A1 | 5/2004 | Dettinger et al. ................. 707/4 |
| 2004/0107125 A1 | 6/2004 | Guheen et al. .................... 705/7 |
| 2004/0122844 A1 | 6/2004 | Malloy et al. ................. 707/102 |
| 2004/0122846 A1 | 6/2004 | Chess et al. ................... 707/102 |
| 2004/0123240 A1 | 6/2004 | Gerstl et al. ................... 715/513 |
| 2004/0128624 A1 | 7/2004 | Arellano et al. ............. 715/530 |
| 2004/0143600 A1 | 7/2004 | Musgrove et al. |
| 2004/0153456 A1 | 8/2004 | Charnock et al. ............. 707/10 |
| 2004/0167870 A1 | 8/2004 | Wakefield et al. ................ 707/1 |
| 2004/0167907 A1 | 8/2004 | Wakefield et al. |
| 2004/0167911 A1 | 8/2004 | Wakefield et al. |
| 2004/0177015 A1 | 9/2004 | Galai et al. .................... 705/35 |
| 2004/0177080 A1 | 9/2004 | Doise et al. ................... 707/100 |
| 2004/0199923 A1 | 10/2004 | Russek ......................... 719/310 |
| 2004/0243552 A1 | 12/2004 | Titemore et al. ................. 707/3 |
| 2004/0243614 A1 | 12/2004 | Boone et al. |
| 2004/0255237 A1 | 12/2004 | Tong ......................... 715/501.1 |
| 2004/0260979 A1 | 12/2004 | Kumai |
| 2004/0267700 A1 | 12/2004 | Dumais et al. |
| 2004/0268237 A1 | 12/2004 | Jones et al. ................... 715/513 |
| 2005/0055365 A1 | 3/2005 | Ramakrishnan et al. |
| 2005/0076012 A1 | 4/2005 | Manber et al. .................... 707/3 |
| 2005/0080613 A1 | 4/2005 | Colledge et al. |
| 2005/0086211 A1 | 4/2005 | Mayer |
| 2005/0086222 A1 | 4/2005 | Wang et al. ....................... 707/5 |
| 2005/0086251 A1 | 4/2005 | Hatscher et al. |
| 2005/0097150 A1 | 5/2005 | McKeon et al. |
| 2005/0108630 A1* | 5/2005 | Wasson et al. ................ 715/513 |
| 2005/0125311 A1 | 6/2005 | Chidiac et al. .................. 705/28 |
| 2005/0149576 A1 | 7/2005 | Marmaros et al. ............ 707/200 |
| 2005/0149851 A1 | 7/2005 | Mittal |
| 2005/0187923 A1 | 8/2005 | Cipollone ........................ 707/3 |
| 2005/0188217 A1 | 8/2005 | Ghanea-Hercock |
| 2005/0240615 A1 | 10/2005 | Barsness et al. .............. 707/102 |
| 2005/0256825 A1 | 11/2005 | Dettinger et al. ................. 707/1 |
| 2006/0036504 A1 | 2/2006 | Allocca et al. ................. 705/26 |
| 2006/0041597 A1 | 2/2006 | Conrad et al. |
| 2006/0047691 A1 | 3/2006 | Humphreys et al. |
| 2006/0047838 A1 | 3/2006 | Chauhan ....................... 709/230 |
| 2006/0053171 A1 | 3/2006 | Eldridge et al. |
| 2006/0053175 A1 | 3/2006 | Gardner et al. |
| 2006/0064411 A1 | 3/2006 | Gross et al. ....................... 707/3 |
| 2006/0074824 A1 | 4/2006 | Li ................................. 706/20 |
| 2006/0074910 A1 | 4/2006 | Yun et al. ........................... 707/7 |
| 2006/0085465 A1 | 4/2006 | Nori et al. ..................... 707/101 |
| 2006/0112110 A1 | 5/2006 | Maymir-Ducharme et al. ............................ 707/100 |
| 2006/0123046 A1 | 6/2006 | Doise et al. ................... 707/102 |
| 2006/0129843 A1 | 6/2006 | Srinivasa et al. |
| 2006/0136585 A1 | 6/2006 | Mayfield et al. |
| 2006/0143227 A1 | 6/2006 | Helm et al. |
| 2006/0143603 A1 | 6/2006 | Kalthoff et al. |
| 2006/0152755 A1 | 7/2006 | Curtis et al. .................. 358/1.15 |
| 2006/0167991 A1 | 7/2006 | Heikes et al. |
| 2006/0224582 A1 | 10/2006 | Hogue .............................. 707/6 |
| 2006/0238919 A1 | 10/2006 | Bradley |
| 2006/0242180 A1 | 10/2006 | Graf et al. ..................... 707/101 |
| 2006/0248045 A1 | 11/2006 | Toledano et al. |
| 2006/0248456 A1 | 11/2006 | Bender et al. ................. 715/531 |
| 2006/0253418 A1 | 11/2006 | Charnock et al. ................ 707/1 |
| 2006/0259462 A1 | 11/2006 | Timmons ......................... 707/3 |
| 2006/0277169 A1 | 12/2006 | Lunt et al. ......................... 707/3 |
| 2006/0288268 A1 | 12/2006 | Srinivasan et al. |
| 2006/0293879 A1* | 12/2006 | Zhao et al. ........................ 704/9 |
| 2007/0005593 A1* | 1/2007 | Self et al. .......................... 707/6 |
| 2007/0005639 A1 | 1/2007 | Gaussier et al. ............. 707/103 |
| 2007/0016890 A1 | 1/2007 | Brunner et al. ............... 717/107 |
| 2007/0038610 A1 | 2/2007 | Omoigui ........................... 707/3 |
| 2007/0043708 A1 | 2/2007 | Tunstall-Pedoe |
| 2007/0055656 A1 | 3/2007 | Tunstall-Pedoe ................. 707/3 |
| 2007/0073768 A1 | 3/2007 | Goradia ..................... 707/104.1 |
| 2007/0094246 A1 | 4/2007 | Dill et al. .......................... 707/4 |
| 2007/0100814 A1 | 5/2007 | Lee et al. |
| 2007/0130123 A1 | 6/2007 | Majumder ........................ 707/3 |
| 2007/0143282 A1 | 6/2007 | Betz et al. ......................... 707/5 |
| 2007/0143317 A1* | 6/2007 | Hogue et al. .................. 707/100 |
| 2007/0150800 A1* | 6/2007 | Betz et al. ..................... 715/500 |
| 2007/0198451 A1* | 8/2007 | Kehlenbeck et al. ........... 706/50 |
| 2007/0198480 A1 | 8/2007 | Hogue et al. ..................... 707/3 |
| 2007/0198481 A1 | 8/2007 | Hogue et al. ..................... 707/3 |
| 2007/0198503 A1 | 8/2007 | Hogue et al. ..................... 707/5 |
| 2007/0198577 A1* | 8/2007 | Betz et al. ................ 707/103 R |
| 2007/0198598 A1 | 8/2007 | Betz et al. ..................... 707/201 |
| 2007/0198600 A1 | 8/2007 | Betz ............................. 707/201 |
| 2007/0203867 A1 | 8/2007 | Hogue et al. ................... 706/48 |
| 2007/0208773 A1 | 9/2007 | Tsao ............................. 707/103 |
| 2007/0271268 A1 | 11/2007 | Fontoura et al. .................. 707/6 |
| 2008/0071739 A1 | 3/2008 | Kumar et al. |
| 2008/0104019 A1 | 5/2008 | Nath |
| 2009/0006359 A1 | 1/2009 | Liao |
| 2009/0119255 A1 | 5/2009 | Frank et al. ....................... 707/3 |

FOREIGN PATENT DOCUMENTS

| | | | |
|---|---|---|---|
| JP | 2002-157276 | 5/2002 | |
| JP | 2002-540506 | 11/2002 | |
| JP | 2003-281173 | 10/2003 | |
| WO | WO 01/27713 | 4/2001 | |
| WO | WO 2004/114163 | 12/2004 | ............. G06F 17/30 |
| WO | WO 2006/104951 | 10/2006 | ............. G06F 17/30 |

OTHER PUBLICATIONS

Agichtein, E., et al., "Snowball Extracting Relations from Large Plain-Text Collections," Columbia Univ. Computer Science Dept. Technical Report CUCS-033-99, Dec. 1999, pp. 1-13.

Brill, E., et al., "An Analysis of the AskMSR Question-Answering System," Proceedings of the Conference of Empirical Methods in Natural Language Processing (EMNLP), Jul. 2002, pp. 257-264.

Brin, S., Extracting Patterns and Relations from the World Wide Web, 1999, 12 pages.

Brin, S., et al., "The Anatomy of a Large-Scale Hypertextual Web Search Engine," 7th Int'l World Wide Web Conference, Brisbane, Australia, Apr. 14-18, 1998, pp. 1-26.

Bunescu, R., et al., "Using Encyclopedia Knowledge for Named Entity Disambiguation," Department of Computer Sciences, University of Texas, retrieved from internet Dec. 28, 2006, 8 pages.

Chang, C., et al., "IEPAD: Information Extraction Based on Pattern Discovery," WWW 10 '01, ACM, May 1-5, 2001, pp. 681-688.

Chu-Carroll, J., et al., "A Multi-Strategy and Multi-Source Approach to Question Answering," 2006, 8 pages.

Craswell, N., et al., "Effective Site Finding using Link Anchor Information," SIGIR '01, Sep. 9-12, 2001, pp. 250-257.

Dean, J., et al., "MapReduce: Simplified Data Processing on Large Clusters," OSDI, 2004, pp. 1-13.

Dong, X., et al., "Reference Reconciliation in Complex Information Spaces," SIGACM-SIGMOD, 2005, 12 pages.

(56) References Cited

OTHER PUBLICATIONS

Downey, D., et al., "Learning Text Patterns for Web Information Extraction and Assessment," American Association for Artificial Intelligence, 2002, 6 pages.

Etzioni, O., et al., "Web-scale Information Extraction in KnowItAll (Preliminary Results)," WWW2004, ACM May 17-20, 2004, 11 pages.

Freitag, D., et al., "Boosted Wrapper Induction," American Association for Artificial Intelligence, 2000, 7 pages.

Gao, X., et al., "Learning Information Extraction Patterns from Tabular Web Pages Without Manual Labelling," Proceedings of IEEE/WIC Int'l Conf. on Web Intelligence (WI'03), Oct. 13-17, 2003, pp. 495-498.

Gray, R.M., "Entropy and Information Theory," Springer-Verlag, New York, NY, 1990, pp. 17-46.

Guha, R., "Object Co-Identification on the Semantic Web," WWW2004, ACM, May 17-22, 2004, 9 pages.

Guha, R., et al., "Disambiguating People in Search," World Wide Web Conference, May 17-22, 2004, 9 pages.

Haveliwala, T.H., "Topic-Sensitive PageRank," Proceeding of the 11th Int'l World Wide Web Conference, Honolulu, Hawaii, May 7-11, 2002, pp. 1-23.

Hogue, A. W., Tree Pattern Inference and Matching for Wrapper Induction on the World Wide Web, Master of Engineering in Electrical Engineering and Computer Science, Massachusetts Institute of Technology, Jun. 2004, pp. 3-106.

"Information Entropy," Wikipedia, the Free Encyclopedia, Retrieved on May 3, 2006, pp. 1-9.

"Information Theory," Wikipedia, the Free Encyclopedia,: Retrieved on May 3, 2006, pp. 1-12.

International Search Report and Written Opinion for International Application No. PCT/US2007/61156, mailed Feb. 11, 2008, 7 pages.

International Search Report and Written Opinion for International Application No. PCT/US2006/019807, mailed Dec. 18, 2006, 4 pages.

International Search Report and Written Opinion for International Application No. PCT/US2006/07639, mailed Sep. 13, 2006, 6 pages.

Jeh, G., et al., "Scaling Personalized Web Search," Proceedings of the 12th Int'l World Wide Web Conference, Budapest, Hungary, May 20-24, 2003, pp. 1-24.

Ji, H., et al., "Re-Ranking Algorithms for Name Tagging," Workshop on Computationally Hard Problems and Joint Inference in Speech and Language Processing, Jun. 2006, 8 pages.

Jones, R., et al., Bootstrapping for Text Learning Tasks, 1999, 12 pages.

Kolodner, J., "Indexing and Retrieval Strategies for Natural Language Fact Retrieval," ACM Trans. Database Syst. 8.3., Sep. 1983, 434-464.

Kosseim, L., et al., "Answer Formulation for Question-Answering," 11 pages, Oct. 1, 2007.

Liu, B. et al., "Mining Data Records in Web Pages," Conference 2000, ACM, 2000, pp. 1-10.

MacKay, D.J.C., "Information Theory, Inference and Learning Algorithms," Cambridge University Press, 2003, pp. 22-33, 138-140.

Mann, G. et al., "Unsupervised Personal Name Disambiguation," Proceedings of the Seventy Conference on Natural Language Learning at HLT-NAACL, 2003, 8 pages.

McCallum, A., et al., "Object Consolidation by Graph Partitioning with a Conditionally-Trained Distance Metric," SIGKDD 03, ACM, Aug. 24-27, 2003, 6 pages.

Mihalcea, R., et al., "PageRank on Semantic Networks, with Application to Word Sense Disambiguation, Proceedings of the 20th International Conference on Computational Linguistics, Aug. 23-27, 2004, 7 pages.

Mihalcea, R., et al., "TextRank: Bringing Order into Texts," Proceedings of the Conference on Empirical Methods in Natural Language Processing, Jul. 2004, 8 pages.

Page, L., et al., "The PageRank Citation Ranking: Bringing Order to the Web," Stanford Digital Libraries Working Paper, 1998, pp. 1-17.

Pawson, D., "Sorting and Grouping," www.dpawson.co.uk/xsl/sect2/N6280.html>, Feb. 7, 2004, pp. 1-19.

Prager, J. et al., "IBM's Piquant in TREC2003," 2003, 10 pages.

Prager, J., et al., "Question Answering Using Constraint Satisfaction: QA-by-Dossier-with-Constraints," 2004, 8 pages.

Ramakrishnan, G., et al., "Is Question Answering an Acquired Skill?"WWW2004, ACM May 17, 2004, pp. 111-120.

Richardson, M., et al., "Beyond Page Rank: Machine Learning for Static Ranking," International World Wide Web Conference Committee, May 23, 2006, 9 pages.

Richardson, M., et al., "The Intelligent Surfer: Probabilistic Combination of Link and Content Information in PageRank," Advances in Neural Information Processing Systems, vol. 14, MIT Press, Cambridge, MA, 2002, 8 pages.

Rioloff, E., et al., "Learning Dictionaries for Information Extraction by Multi-Level Bootstrapping," American Association for Artificial Intelligence, 1999, 6 pages.

Shannon, C.E., et al., "A Mathematical Theory of Communication," The Bell System Technical Journal, vol. 27, Jul., Oct. 1948, pp. 1-55.

Sun Microsystems, "Attribute Names," http://java.sun.com/products/jndi/tutorial/basics/directory/attrnames.html>, Feb. 17, 2004, pp. 1-2.

Wang, Y., et al., "C4-2: Combining Link and Contents in Clustering Web Search to Improve Information Interpretation," The University of Tokyo, 2002, , pp. 1-9.

Cover, T.M., et al., "Elements of Information Theory," Wiley-InterScience, New York, NY, 1991, pp. 12-23.

Gigablast, Web/Directory, http://www.gigablast.com/?c=dmoz3, printed Aug. 24, 2010, 1 page.

Gilster, P., "Get Fast Answers, Easily," The News Observer, May 14, 2003, 2 pages.

Hsu, C. et al., "Finite-State Transducers for Semi-Structured Text Mining," IJCAI-99 Workshop on Text Mining: Foundations, Techniques and Applications, 1999, 12 pages.

Iiyas, I. et al., "Rank-aware Query Optimization," SIGMOD 2004, Jun. 13-18, 2004, 12 pages.

International Search Report and Written Opinion for International Application No. PCT/US2006/010965, mailed Jul. 5, 2006, 4 pages.

Kosala, R., et al, "Web Mining Research: A Survey," SIGKDD Explorations, vol. 2, Issue 1, p. 1, Jul. 2000, 15 pages.

Lin, J. et al., Question Answering from the Web Using Knowledge Annotation and Knowledge Mining Techniques, CIKM '03, Nov. 3-8, 2003, 8 pages.

Nyberg, E. et al., "The JAVELIN Question-Answering System at TREC 2003: A Multi-Strategy Approach with Dynamic Planning," TREC 2003, 9 pages.

Ogden, W. et al., "Improving Cross-Language Text Retrieval with Human Interactions," Proceedings of the 33rd Hawaii International Conference on System Sciences, IEEE 2000, 9 pages.

Plaisant, C. et al. "Interface and Data Architecture for Query Preview in Networked Information Systems," ACM Transaction on Information Systems, vol. 17, Issue 3, Jul. 1999, 28 pages.

Wirzenius, Lars, "C Preprocessor Trick for Implementing Similar Data Types," Jan. 17, 2000, pp. 1-9.

Andritsos, Information-Theoretic Tools for Mining Database Structure from Large Data Sets, ACM SIGMOD, Jun. 13-18, 2004, 12 pgs.

Chen, A Scheme for Inference Problems Using Rough Sets and Entropy, Lecture Notes in Computer Science, vol. 3642/2005, Regina, Canada, Aug. 31-Sep. 3, 2005, pp. 558-567.

Dean, Using Design Recovery Techniques to Transform Legacy Systems, Software Maintenance, Nov. 7-9, 2001, Proceedings, IEEE International Conference, 10 pgs.

Etzioni, Unsupervised Named-Entity Extraction from the Web: An Experimental Study, Dept. of Computer Science and Engineering, Univ. of Washington, Seattle, WA, Feb. 28, 2005, 42 pgs.

Google, Canadian Patent Application 2610208, Office Action, Sep. 21, 2011, 3 pgs.

Google, European Patent Application 06784449.8, Office Action, Mar. 26, 2012, 7 pgs.

Google, Japanese Patent Application 2008-504204, Office Action, Oct. 12, 2011, 4 pgs.

(56) References Cited

OTHER PUBLICATIONS

Koeller, Approximate Matching of Textual Domain Attributes for Information Source Integration, IQIS '05 Proceedings of the 2nd International Workshop on Information Source Integration, Jun. 17, 2005, 10 pgs.
Merriam Webster Dictionary defines "normalize" as "to make conform to or reduce to a norm or standard", date: 1865, 2 pages.
Merriam Webster Dictionary defines "value" as "a numerical quantity that is assigned or is determined by calculation or measurement", date: 1300, 2 pages.
Microsoft Computer Dictionary defines "normalize" as "adjust number within specific range", May 1, 2002, 4 pages.
Microsoft Computer Dictionary Defines "quantity" as a "number", May 1, 2002, 4 pages.
Microsoft Computer Dictionary defines "value" as "a quantity", May 1, 2002, 4 pages.
Nadeau, Unsupervised named-Entity Recognition: Generating Gazetteers and Resolving Ambiguity, Inst. for Information Technology, National Research Council Canada, Gatineau and Ottawa, Canada, Aug. 1, 2006, 12 pgs.
Betz, Office Action, U.S. Appl. No. 11/394,552, filed Apr. 23, 2013, 21 pgs.
Betz, Office Action, U.S. Appl. No. 13/302,755, filed Mar. 25, 2012, 15 pgs.
Google Inc., Office Action, CA 2603085, Sep. 18, 2012, 2 pgs.
Hogue, Office Action, U.S. Appl. No. 13/549,361, filed Mar. 6, 2013, 13 pgs.
Hogue, Office Action, U.S. Appl. No. 13/603,354, filed Jan. 9, 2013, 5 pgs.
Laroco, Office Action, U.S. Appl. No. 13/364,244, filed Jan. 30, 2013, 8 pgs.
Shamsi, Office Action, U.S. Appl. No. 13/171,296, filed Apr. 3, 2013, 7 pgs.
Betz, Examiner's Answer, U.S. Appl. No. 11/097,688, filed Jul. 8, 2010, 18 pgs.
Betz, Examiner's Answer, U.S. Appl. No. 11/394,414, filed Jan. 24, 2011, 31 pgs.
Betz, Notice of Allowance, U.S. Appl. No. 11/142,740, filed Apr. 16, 2009, 7 pgs.
Betz, Notice of Allowance, U.S. Appl. No. 11/142,765, filed Jul. 1, 2010, 14 pgs.
Betz, Notice of Allowance, U.S. Appl. No. 11/341,069, filed Sep. 8, 2008, 6 pgs.
Betz, Notice of Allowance, U.S. Appl. No. 12/939,981, filed Aug. 11, 2011, 7 pgs.
Betz, Notice of Allowance, U.S. Appl. No. 12/939,981, filed Apr. 26, 2011, 11 pgs.
Betz, Office Action, U.S. Appl. No. 11/142,740, filed Aug. 13, 2007, 12 pgs.
Betz, Office Action, U.S. Appl. No. 11/142,740, filed May 17, 2007, 12 pgs.
Betz, Office Action, U.S. Appl. No. 11/142,740, filed Jul. 23, 2008, 11 pgs.
Betz, Office Action, U.S. Appl. No. 11/142,740, filed Dec. 26, 2007, 12 pgs.
Betz, Office Action, U.S. Appl. No. 11/142,740, filed Jan. 27, 2009, 11 pgs.
Betz, Office Action, U.S. Appl. No. 11/142,740, filed Apr. 30, 2008, 14 pgs.
Betz, Office Action, U.S. Appl. No. 11/097,688, filed Mar. 18, 2009, 13 pgs.
Betz, Office Action, U.S. Appl. No. 11/097,688, filed Oct. 29, 2009, 11 pgs.
Betz, Office Action, U.S. Appl. No. 11/142,765, filed Jan. 8, 2010, 17 pgs.
Betz, Office Action, U.S. Appl. No. 11/142,765, filed May 9, 2008, 20 pgs.
Betz, Office Action, U.S. Appl. No. 11/142,765, filed Jan. 17, 2008, 16 pgs.
Betz, Office Action, U.S. Appl. No. 11/142,765, filed Oct. 17, 2007, 14 pgs.
Betz, Office Action, U.S. Appl. No. 11/142,765, filed Oct. 17, 2008, 17 pgs.
Betz, Office Action, U.S. Appl. No. 11/142,765, filed Jun. 18, 2007, 13 pgs.
Betz, Office Action, U.S. Appl. No. 11/142,765, filed Apr. 28, 2009. 16 pgs.
Betz, Office Action, U.S. Appl. No. 11/341,069, filed Apr. 1, 2008, 8 pgs.
Betz, Office Action, U.S. Appl. No. 11/394,414, filed Mar. 5, 2010, 24 pgs.
Betz, Office Action, U.S. Appl. No. 11/394,414, filed Sep. 15, 2009, 16 pgs.
Betz, Office Action, U.S. Appl. No. 11/394,552, filed Apr. 1, 2008, 14 pgs.
Betz, Office Action, U.S. Appl. No. 11/394,552, filed Aug. 4, 2010, 19 pgs.
Betz, Office Action, U.S. Appl. No. 11/394,552, filed Feb. 8, 2011, 22 pgs.
Betz, Office Action, U.S. Appl. No. 11/394,552, filed Jul. 8, 2011, 13 pgs.
Betz, Office Action, U.S. Appl. No. 11/394,552, filed Apr. 11, 2012, 15 pgs.
Betz, Office Action, U.S. Appl. No. 11/394,552, filed Nov. 12, 2008, 11 pgs.
Betz, Office Action, U.S. Appl. No. 1/394,552, filed Jan. 13, 2010, 15 pgs.
Betz, Office Action, U.S. Appl. No. 11/394,552, filed Mar. 13, 2009, 12 pgs.
Betz, Office Action, U.S. Appl. No. 11/394,552, filed Sep. 24, 2012, 21 pgs.
Betz, Office Action, U.S. Appl. No. 12/939,981, filed Dec. 9, 2010, 12 pgs.
Hogue, Examiner's Answer, U.S. Appl. No. 11/142,748, filed Oct. 3, 2011, 23 pgs.
Hogue, Notice of Allowance, U.S. Appl. No. 11/907,689, filed Apr. 30, 2009, 8 pgs.
Hogue, Notice of Allowance, U.S. Appl. No. 11/356,837, filed Jan. 6, 2012, 12 pgs.
Hogue, Notice of Allowance, U.S. Appl. No. 11/356,837, filed Apr. 27, 2012, 7 pgs.
Hogue, Notice of Allowance, U.S. Appl. No. 12/546,578, filed Jan. 6, 2011, 8 pgs.
Hogue, Notice of Allowance, U.S. Appl. No. 12/546,578, filed Jul. 12, 2011, 10 pgs.
Hogue, Notice of Allowance, U.S. Appl. No. 13/206,457, filed Mar. 14, 2012, 9 pgs.
Hogue, Office Action, U.S. Appl. No. 11/907,689, filed Oct. 3, 2008, 13 pgs.
Hogue, Office Action, U.S. Appl. No. 11/097,689, Apr. 9, 2008, 11 pgs.
Hogue, Office Action, U.S. Appl. No. 11/097,689, filed Jun. 21, 2007, 9 pgs.
Hogue, Office Action, U.S. Appl. No. 11/097,689, Nov. 27, 2007, 10 pgs.
Hogue, Office Action, U.S. Appl. No. 11/142,748, filed Dec. 7, 2007, 13 pgs.
Hogue, Office Action, U.S. Appl. No. 11/142,748, filed Jul. 13, 2010, 12 pgs.
Hogue, Office Action, U.S. Appl. No. 11/142,748, Aug. 17, 2009, 14 pgs.
Hogue, Office Action, U.S. Appl. No. 11/142,748, Nov. 17, 2010, 14 pgs.
Hogue, Office Action, U.S. Appl. No. 11/142,748, filed May 18, 2007, 9 pgs.
Hogue, Office Action, U.S. Appl. No. 11/142,748, filed Jul. 22, 2008, 18 pgs.
Hogue, Office Action, U.S. Appl. No. 11/142 748, filed Aug. 23, 2007, 13 pgs.
Hogue, Office Action, U.S. Appl. No. 11/142,748, filed Jan. 27, 2009, 17 pgs.

(56) References Cited

OTHER PUBLICATIONS

Hogue, Office Action, U.S. Appl. No. 11/356,837, filed Jun. 3, 2011, 18 pgs.
Hogue, Office Action, U.S. Appl. No. 11/356,837, filed Aug. 4, 2010, 20 pgs.
Hogue, Office Action, U.S. Appl. No. 11/356,837, filed Feb. 8, 2011, 14 pgs.
Hogue, Office Action, U.S. Appl. No. 11/356,837, filed May 11, 2009, 18 pgs.
Hogue, Office Action, U.S. Appl. No. 11/356,837, filed Feb. 19, 2010, 20 pgs.
Hogue, Office Action, U.S. Appl. No. 11/356,837, filed Mar. 21, 2008, 15 pgs.
Hogue, Office Action, U.S. Appl. No. 11/356,837, filed Oct. 27, 2009, 20 pgs.
Hogue, Office Action, U.S. Appl. No. 11/356,837, filed Sep. 30, 2008, 20 pgs.
Hogue, Office Action, U.S. Appl. No. 11/399,857, filed Mar. 1, 2012, 25 pgs.
Hogue, Office Action, U.S. Appl. No. 11/399,857, filed Mar. 3, 2011, 15 pgs.
Hogue, Office Action, U.S. Appl. No. 11/399,857, filed Jan. 5, 2009, 21 pgs.
Hogue, Office Action, U.S. Appl. No. 11/399,857, filed Jun. 8 2009, 14 pgs.
Hogue, Office Action, U.S. Appl. No. 11/399,857, filed Sep. 13, 2010, 13 pgs.
Hogue, Office Action, U.S. Appl. No. 11/399,857, filed Jun. 24, 2011, 14 pgs.
Hogue, Office Action, U.S. Appl. No. 11/399,857, filed Dec. 28, 2009, 11 pgs.
Hogue, Office Action, U.S. Appl. No. 11/399,857, filed Mar. 31, 2008, 23 pgs.
Hogue, Office Action, U.S. Appl. No. 12/546,578, filed Aug. 4, 2010, 10 pgs.
Hogue, Office Action, U.S. Appl. No. 13/206,457, filed Oct. 28, 2011, 6 pgs.
Hogue, Office Action, U.S. Appl. No. 13/549,361, filed Oct. 4, 2012, 18 pgs.
Laroco, Notice of Allowance, U.S. Appl. No. 11/551,657, filed May 13, 2011, 8 pgs.
Laroco, Notice of Allowance, U.S. Appl. No. 11/551,657, filed Sep. 28, 2011, 8 pgs.
Laroco, Office Action, U.S. Appl. No. 11/551,657, filed Aug. 1, 2008, 15 pgs.
Laroco, Office Action, U.S. Appl. No. 11/551,657, filed Aug. 13, 2009, 16 pgs.
Laroco, Office Action, U.S. Appl. No. 11/551,657, filed Nov. 17, 2010, 20 pgs.
Laroco, Office Action, U.S. Appl. No. 11/551,657, filed Feb. 24, 2010, 17 pgs.
Laroco, Office Action, U.S. Appl. No. 11/551,657, filed Jan. 28, 2009, 17 pgs.
Rohde, Notice of Allowance, U.S. Appl. No. 11/097,690, filed Dec. 23, 2010, 8 pgs.
Rohde, Office Action, U.S. Appl. No. 11/097,690, filed May 1, 2008, 21 pgs.
Rohde, Office Action, U.S. Appl. No. 11/097,690, filed Jun. 9, 2010, 11 pgs.
Rohde, Office Action, U.S. Appl. No. 11/097,690, filed Oct. 15, 2008, 22 pgs.
Rohde, Office Action, U.S. Appl. No. 11/097,690, filed Aug. 27, 2009, 13 pgs.
Rohde, Office Action, U.S. Appl. No. 11/097,690, filed Apr. 28, 2009, 9 pgs.
Rohde, Office Action, U.S. Appl. No. 11/097,690, filed Sep. 28, 2007, 17 pgs.
Shamsi, Notice of Allowance, U.S. Appl. No. 11/781,891, filed Oct. 25, 2010, 7 pgs.
Shamsi, Notice of Allowance, U.S. Appl. No. 11/781,891, filed May 27, 2010, 6 pgs.
Shamsi, Office Action, U.S. Appl. No. 11/781,891, filed Nov. 16, 2009, 10 pgs.
Vespe, Notice of Allowance, U.S. Appl. No. 11/686,217, filed Aug. 27, 2012, 11 pgs.
Vespe, Notice of Allowance, U.S. Appl. No. 11/745,605, filed Jun. 13, 2011, 9 pgs.
Vespe, Notice of Allowance, U.S. Appl. No. 11/745,605, filed Sep. 22, 2011, 9 pgs.
Vespe, Notice of Allowance, U.S. Appl. No. 11/745,605, filed Mar. 28, 2012, 10 pgs.
Vespe, Office Action, U.S. Appl. No. 11/686,217, filed Sep. 10, 2010, 14 pgs.
Vespe, Office Action, U.S. Appl. No. 11/686,217, filed Jan. 26, 2012, 12 pgs.
Vespe, Office Action, U.S. Appl. No. 11/686,217, filed Mar. 26, 2010, 13 pgs.
Vespe, Office Action, U.S. Appl. No. 11/745,605, filed Apr. 8, 2010, 15 pgs.
Vespe, Office Action, U.S. Appl. No. 11/745,605, filed Jul. 30, 2009, 17 pgs.
Zhao, Notice of Allowance, U.S. Appl. No. 11/394,610, filed May 11, 2009, 15 pgs.
Zhao, Office Action, U.S. Appl. No. 11/142,853, filed Oct. 2, 2009, 10 pgs.
Zhao, Office Action, U.S. Appl. No. 11/142,853, filed Sep. 5, 2008, 9 pgs.
Zhao, Office Action, U.S. Appl. No. 11/142,853, filed Mar. 17, 2009, 9 pgs.
Zhao, Office Action, U.S. Appl. No. 11/142,853, filed Jan. 25, 2008, 7 pgs.
Zhao, Office Action, U.S. Appl. No. 11/394,610, filed Apr. 1, 2008, 18 pgs.
Zhao, Office Action, U.S. Appl. No. 11/394,610, filed Nov. 13, 2008, 18 pgs.
Betz, Final Office Action, U.S. Appl. No. 11/394,552, filed Oct. 21, 2013, 22 pgs.
Betz, Notice of Allowance, U.S. Appl. No. 11/097,688, filed Nov. 19, 2013, 17 pgs.
Betz, Notice of Allowance, U.S. Appl. No. 13/302,755, filed Aug. 28, 2013, 6 pgs.
Hogue, Notice of Allowance, U.S. Appl. No. 13/549,361, filed Oct. 2, 2013, 9 pgs.
Hogue, Notice of Allowance, U.S. Appl. No. 13/549,361, filed Jun. 26, 2013, 8 pgs.
Hogue, Notice of Allowance, U.S. Appl. No. 13/603,354, filed Nov. 12, 2013, 9 pgs.
Hogue, Notice of Allowance, U.S. Appl. No. 13/603,354, filed Jun. 26, 2013, 8 pgs.
Laroco, Notice of Allowance, U.S. Appl. No. 13/364,244, filed Aug. 6, 2013, 6 pgs.
Laroco, Office Action, U.S. Appl. No. 13/364,244, Dec. 19, 2013, 5 pgs.
Shamsi, Final Office Action, U.S. Appl. No. 13/171,296, filed Nov. 4, 2013, 29 pgs.

* cited by examiner

Example Format of Facts in Repository (each fact is associated with an object ID)

Example Facts in Repository (each
fact is associated with an object ID)

Example Object Reference Table

Example Format of Facts in
Repository (each fact is associated
with an object ID)

Example Objects

FIG. 5

Wikipedia.org Domain 501

Document D1
George Washington – Wikipedia, the free encyclopedia

......
Born  February 22, 1732
Died  December 14, 1799
Spouse Martha Dandridge Custis Washington
......

Document D2
Canada – Wikipedia, the free encyclopedia

......
Capital  Ottawa
Area     9,984,670 km$^2$
GDP      $1.105 trillion
......

Document D3
Help:Contents – Wikipedia, the free encyclopedia

......

Document D4
Isaac Asimov – Wikipedia, the free encyclopedia

......
Born  January 2, 1920
Died  April 6, 1992
......

Document D5
Fundraising – Wikimedia Foundation

......

Object Q1

| Attribute | Value | Source |
|---|---|---|
| Name | George Washington | http://en.wikipedia.org/wiki/George_washington |
| Born | February 22, 1732 | http://en.wikipedia.org/wiki/George_washington |

LEARNING OBJECTS AND FACTS FROM DOCUMENTS

CROSS-REFERENCE TO RELATED PATENT APPLICATIONS

This application is related to U.S. Utility patent application Ser. No. 11/394,610, entitled "Determining Document Subject by Using Title and Anchor Text of Related Documents," by Shubin Zhao, filed on Mar. 31, 2006, the disclosure of which is hereby incorporated by reference in its entirety.

TECHNICAL FIELD

The disclosed embodiments relate generally to fact databases. More particularly, the disclosed embodiments relate to learning objects and facts from documents.

BACKGROUND

As computers and networks gain popularity, web-based computer documents ("documents") become a vast source of factual information. Users may look to these documents to get answers to factual questions, such as "what is the capital of Poland" or "what is the birth date of George Washington." The factual information included in these documents may be extracted and stored in a fact database.

Documents are often generated based on a template. For example, titles of the documents in the wikipedia.org website often follow a pattern of "[SUBJECT]—Wikipedia, the free encyclopedia," where the section in square bracket is substituted with the subject of the 24207/11661/DOCS/1631371.6 page. These documents also often represent facts in a structured format. For example, documents in the wikipedia.org website frequently list facts in a table format.

Conventionally, objects (or entities) and related facts described in documents are identified and extracted (or learned) by human editors. This approach is insufficient for mass fact extraction because the vast volume of documents and the rapid increase in the number of available documents make it impractical for human editors to perform the task on any meaningful scale.

Based on the above, there is a need for a way to automatically identify objects and facts in documents.

SUMMARY

The above and other needs are met by systems, methods, and computer program products that learn objects and facts from documents. Embodiments of the methods comprise selecting a source object and a source document and identifying a title pattern and a contextual pattern based on the source object and the source document. A set of documents matching the title pattern and the contextual pattern are selected. For each document in the selected set, a name and one or more facts are identified by applying the title pattern and the contextual pattern to the document. Objects are identified or created based on the identified names and associated with the identified facts.

BRIEF DESCRIPTION OF THE DRAWINGS

FIG. 5 illustrates an example of learning objects and facts from a plurality of documents in accordance with one embodiment.

DESCRIPTION OF EMBODIMENTS

Embodiments are now described with reference to the figures where like reference numbers indicate identical or functionally similar elements.

System Architecture and Data Structure

Figure 1:
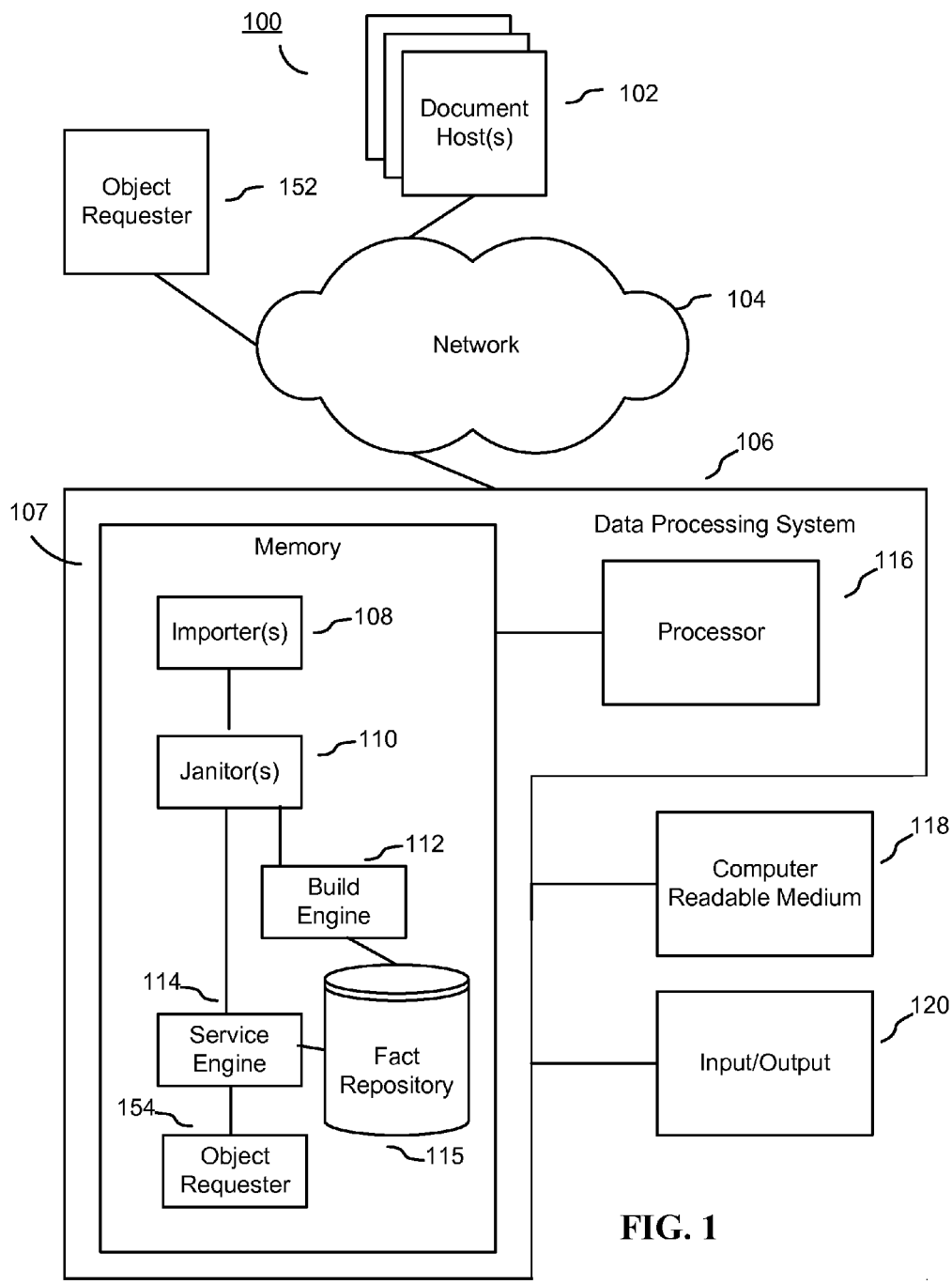
FIG. 1 shows a system architecture adapted to support one embodiment.

FIG. 1 shows a system architecture 100 adapted to support one embodiment. FIG. 1 shows components used to add facts into, and retrieve facts from a repository 115. The system architecture 100 includes a network 104, through which any number of document hosts 102 communicate with a data processing system 106, along with any number of object requesters 152, 154.

Document hosts 102 store documents and provide access to documents. A document is comprised of any machine-readable data including any combination of text, graphics, multimedia content, etc. A document may be encoded in a markup language, such as Hypertext Markup Language (HTML), i.e., a web page, in an interpreted language (e.g., JavaScript) or in any other computer readable or executable format. A document can include one or more hyperlinks to other documents. A typical document will include one or more facts within its content. The facts describe entities, such as real-world or fictional people, places, or things.

A document stored in a document host 102 may be located and/or identified by a Uniform Resource Locator (URL), or Web address, or any other appropriate form of identification and/or location. A document host 102 is implemented by a computer system, and typically includes a server adapted to communicate over the network 104 via networking protocols (e.g., TCP/IP), as well as application and presentation protocols (e.g., HTTP, HTML, SOAP, D-HTML, JAVA®). The documents stored by a host 102 are typically held in a file directory, a database, or other data repository. A host 102 can be implemented in any computing device (e.g., from a PDA or personal computer, a workstation, mini-computer, or mainframe, to a cluster or grid of computers), as well as in any processor architecture or operating system.

FIG. 1 shows components used to manage facts in a fact repository 115. The data processing system 106 includes one or more importers 108, one or more janitors 110, a build engine 112, a service engine 114, and a fact repository 115 (also called simply a "repository"). Each of the foregoing is implemented, in one embodiment, as software modules (or programs) executed by the processor 116. Importers 108 operate to process documents received from the document hosts, read the data content of documents, and extract facts (as operationally and programmatically defined within the data processing system 106) from such documents. The importers 108 also determine the subject or subjects (i.e., the entity or entities) with which the facts are associated, and extract such facts into individual items of data, for storage in the repository 115. In one embodiment, there are different types of importers 108 for different types of documents, for example, dependent on the format or document type.

Janitors 110 operate to process facts extracted by the importer 108. This processing can include but is not limited to, data cleansing, object merging, and fact induction. In one embodiment, there are a number of different janitors 110 that perform different types of data management operations on the facts. For example, one janitor 110 may traverse some set of facts in the repository 115 to find duplicate facts (that is, facts that convey the same factual information) and merge them. Another janitor 110 may also normalize facts into standard formats. Another janitor 110 may also remove unwanted facts from the repository 115, such as facts related to pornographic content. Other types of janitors 110 may be implemented, depending on the types of data management functions desired, such as translation, compression, spelling or grammar correction, and the like.

Various janitors 110 act on facts to normalize attribute names and values, and delete duplicate and near-duplicate facts so an object does not have redundant information. For example, we might find on one page that Britney Spears' birthday is "Dec. 2, 1981" while on another page that her date of birth is "Dec. 2, 1981." Birthday and Date of Birth might both be rewritten as "Birthdate" by one janitor and then another janitor might notice that Dec. 2, 1981 and Dec. 2, 1981 are different forms of the same date. It would choose the preferred form, remove the other fact and combine the source lists for the two facts. As a result, one source page for this fact will contain an exact match of the fact while another source page will contain text that is considered synonymous with the fact.

The build engine 112 builds and manages the repository 115. The service engine 114 is an interface for querying the repository 115. The service engine 114's main function is to process queries, score matching objects, and return them to the caller but it is also used by the janitor 110.

The repository 115 stores factual information about entities. The information is extracted from a plurality of documents that are located on document hosts 102. A document from which a particular fact may be extracted is a source document (or "source") of that particular fact. In other words, a source of a fact includes that fact (or a synonymous fact) within its contents.

The repository 115 contains one or more facts. In one embodiment, the facts are logically organized into "objects," and each object contains a collection of facts associated with a single entity (i.e., real-world or fictional person, place, or thing). Each fact is associated with exactly one object. One implementation for this association includes in each fact an object ID that uniquely identifies the associated object. In this manner, any number of facts may be associated with an individual object, by including the object ID for that object in the facts. In one embodiment, objects themselves are not physically stored in the repository 115, but rather are defined by the set or group of facts with the same associated object ID, as described below. Further details about facts in the repository 115 are described below, in relation to FIGS. 2(a)-2(d).

Some embodiments operate on the facts and/or objects in different orders than described above. For example, in one embodiment the importer 108 provides facts directly to the build engine 112 and/or repository 115. The janitors 110, in turn, operate on the facts and/or objects in the repository 115. It should also be appreciated that in practice at least some of the components of the data processing system 106 will be distributed over multiple computers, communicating over a network. For example, the repository 115 may be deployed over multiple servers. As another example, the janitors 110 may be located on any number of different computers. For convenience of explanation, however, the components of the data processing system 106 are discussed as though they were implemented on a single computer.

In another embodiment, some or all of document hosts 102 are located on the data processing system 106 instead of being coupled to the data processing system 106 by a network. For example, the importer 108 may import facts from a database that is a part of or associated with the data processing system 106.

FIG. 1 also includes components to access the repository 115 on behalf of one or more object requesters 152, 154. Object requesters are entities that request objects from the repository 115. Object requesters 152, 154 may be understood as clients of the system 106, and can be implemented in any computer device or architecture. As shown in FIG. 1, a first object requester 152 is located remotely from system 106, while a second object requester 154 is located in the data processing system 106. For example, in a computer system hosting a blog, the blog may include a reference to an object whose facts are in the repository 115. An object requester 152, such as a browser displaying the blog, will access data processing system 106 so that the information of the facts associated with the object can be displayed as part of the blog web page. As a second example, a janitor 110 or other entity considered to be part of data processing system 106 can function as an object requester 154, requesting the facts of objects from the repository 115.

FIG. 1 shows that the data processing system 106 includes a memory 107 and one or more processors 116. The memory 107 includes the importers 108, janitors 110, build engine 112, service engine 114, and requester 154, each of which is preferably implemented as instructions stored in memory 107 and executable by processor 116. Memory 107 also includes the repository 115. The repository 115 can be stored in a memory of one or more computer systems or in a type of memory such as a disk. FIG. 1 also includes a computer readable storage medium 118 containing, for example, at least one of importers 108, janitors 110, the build engine 112, the service engine 114, the requester 154, and at least some portions of the repository 115. FIG. 1 also includes one or more input/output devices 120 that allow data to be input and output to and from the data processing system 106. It will be understood that embodiments of the data processing system 106 also include standard software components such as operating systems and the like and further include standard hardware components not shown in the figure for clarity of example.

Figure 2A:
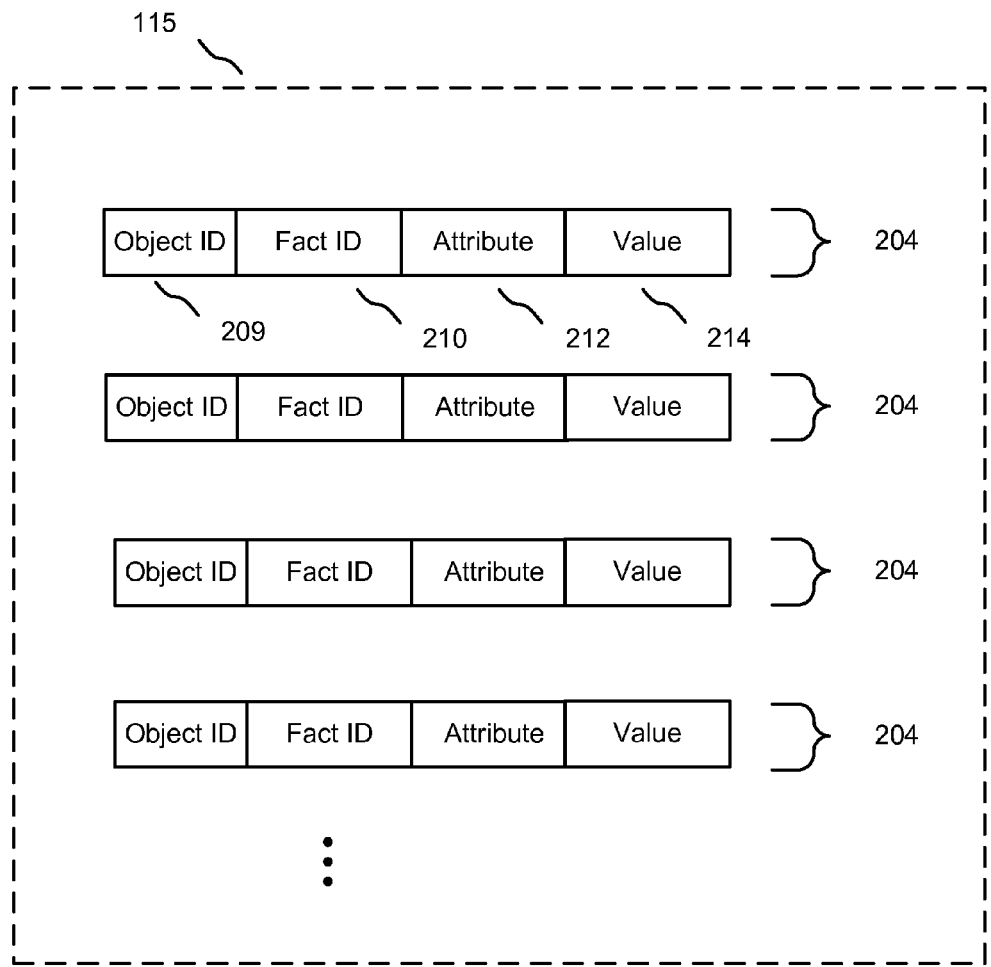
FIGS. 2(a)-2(d) are block diagrams illustrating embodiments of a data structure for facts within a repository of FIG. 1.

FIG. 2(a) shows an example format of a data structure for facts within the repository 115, according to some embodiments. As described above, the repository 115 includes facts 204 describing entities such as real-world and fictional people, places, and things. Each fact 204 includes a unique identifier for that fact, such as a fact ID 210. Each fact 204 includes at least an attribute 212 and a value 214. For example, a fact associated with the entity George Washington may include an attribute of "date of birth" and a value of "Feb. 22, 1732." In one embodiment, all facts are stored as alphanumeric characters since they are extracted from web pages. In another embodiment, facts also can store binary data values. Other embodiments, however, may store fact values as mixed types, or in encoded formats.

As described above, each fact is associated with an object ID 209 that identifies the object with which the fact is associated. Thus, each fact that describes the same entity (such as George Washington), will have the same object ID 209. In one embodiment, the objects are logical concepts that exist as a collection of facts having the same object ID. In another embodiment, objects are stored as units of data in memory, and include references (for example, pointers or IDs) to the facts associated with the object. The logical data structure of a fact can take various forms; in general, a fact is represented by a tuple that includes a fact ID, an attribute, a value, and an object ID. The storage implementation of a fact can be in any underlying physical data structure.

Figure 2B:
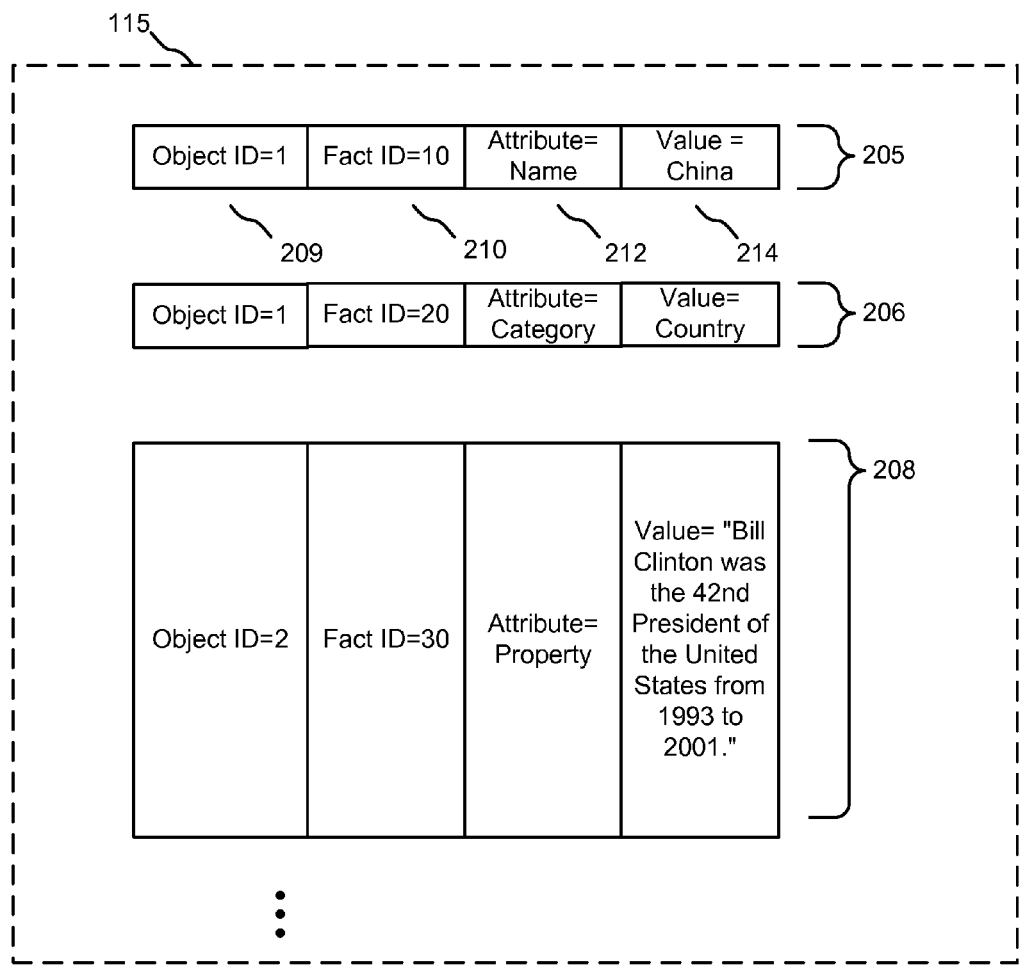

FIG. 2(b) shows an example of facts having respective fact IDs of 10, 20, and 30 in the repository 115. Facts 10 and 20 are associated with an object identified by object ID "1." Fact 10 has an attribute of "Name" and a value of "China." Fact 20 has an attribute of "Category" and a value of "Country." Thus, the object identified by object ID "1" has a name fact 205 with a value of "China" and a category fact 206 with a value of "Country." Fact 30 208 has an attribute of "Property" and a value of "Bill Clinton was the 42nd President of the United States from 1993 to 2001." Thus, the object identified by object ID "2" has a property fact with a fact ID of 30 and a value of "Bill Clinton was the 42nd President of the United States from 1993 to 2001." In the illustrated embodiment, each fact has one attribute and one value. The number of facts associated with an object is not limited; thus while only two facts are shown for the "China" object, in practice there may be dozens, even hundreds of facts associated with a given object. Also, the value fields of a fact need not be limited in size or content. For example, a fact about the economy of "China" with an attribute of "Economy" would have a value including several paragraphs of text, numbers, and perhaps even tables of figures. This content can be formatted, for example, in a markup language. For example, a fact having an attribute "original html" might have a value of the original html text taken from the source web page.

Also, while the illustration of FIG. 2(b) shows the explicit coding of object ID, fact ID, attribute, and value, in practice the content of the fact can be implicitly coded as well (e.g., the first field being the object ID, the second field being the fact ID, the third field being the attribute, and the fourth field being the value). Other fields include but are not limited to: the language used to state the fact (English, etc.), how important the fact is, the source of the fact, a confidence value for the fact, and so on.

Figure 2C:
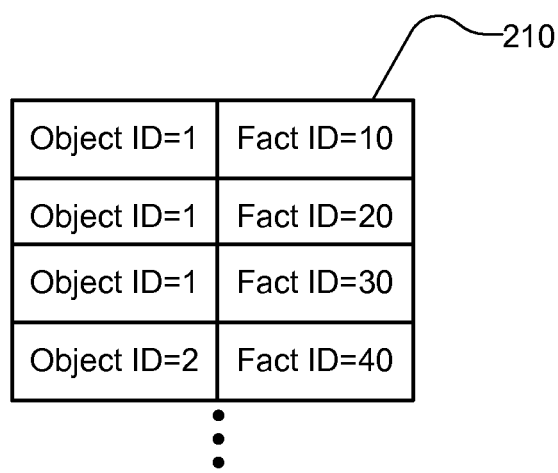

FIG. 2(c) shows an example object reference table 210 that is used in some embodiments. Not all embodiments include an object reference table. The object reference table 210 functions to efficiently maintain the associations between object IDs and fact IDs. In the absence of an object reference table 210, it is also possible to find all facts for a given object ID by querying the repository 115 to find all facts with a particular object ID. While FIGS. 2(b) and 2(c) illustrate the object reference table 210 with explicit coding of object and fact IDs, the table also may contain just the ID values themselves in column or pair-wise arrangements.

Figure 2D:
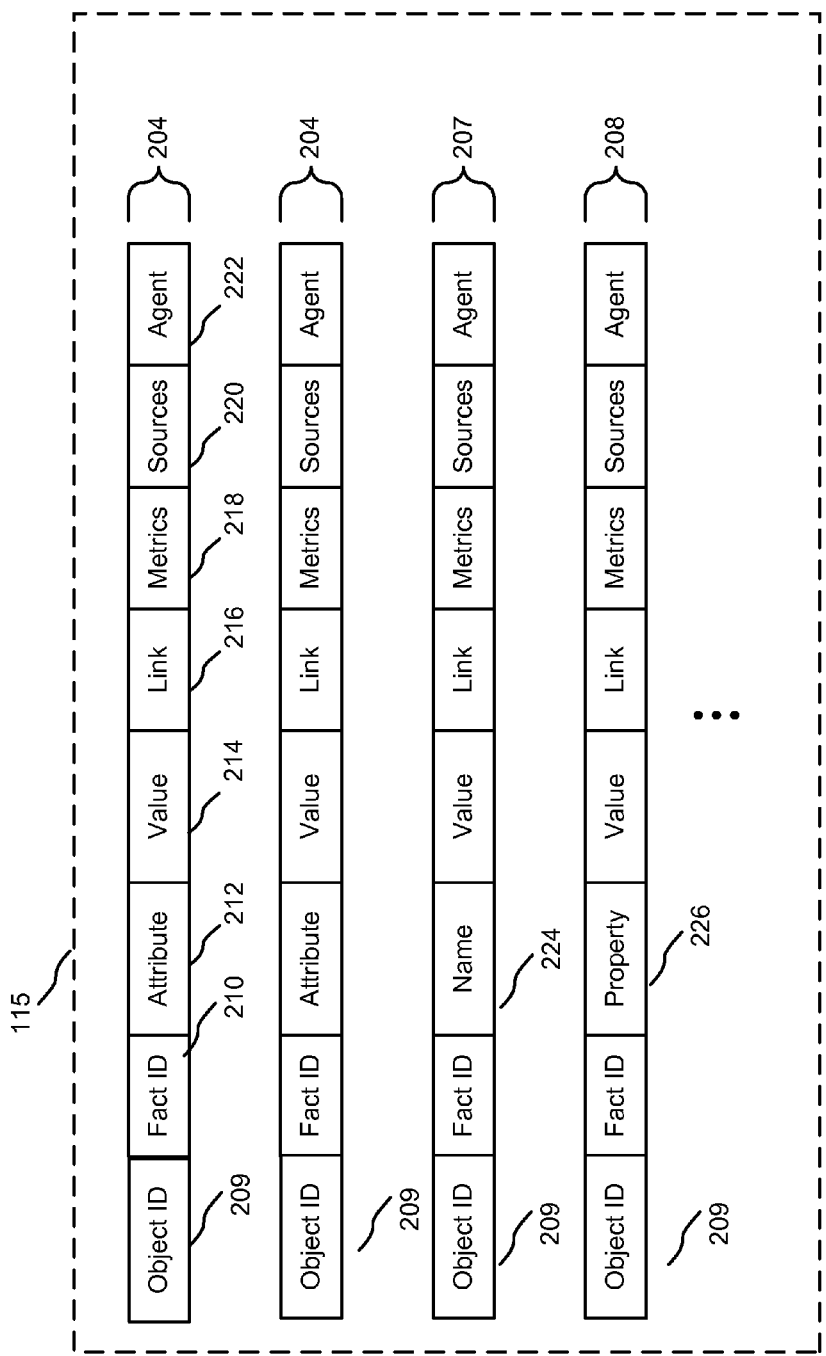

FIG. 2(d) shows an example of a data structure for facts within the repository 115, according to some embodiments, showing an extended format of facts. In this example, the fields include an object reference link 216 to another object. The object reference link 216 can be an object ID of another object in the repository 115, or a reference to the location (e.g., table row) for the object in the object reference table 210. The object reference link 216 allows facts to have as values other objects. For example, for an object associated with the entity "United States," there may be a fact with the attribute of "president" and the value of "George W. Bush," with "George W. Bush" being an object having its own facts in the repository 115. In some embodiments, the value field 214 stores the name of the linked object and the link 216 stores the object identifier of the linked object. Thus, this "president" fact would include the value 214 of "George W. Bush", and an object reference link 216 that contains the object ID for the "George W. Bush" object. In some other embodiments, facts 204 do not include a link field 216 because the value 214 of a fact 204 may store a link to another object.

Each fact 204 also may include one or more metrics 218. A metric provides an indication of the quality of the fact. In some embodiments, the metrics include a confidence level and an importance level. The confidence level indicates the likelihood that the fact is correct. The importance level indicates the relevance of the fact to the object, compared to other facts for the same object. The importance level may optionally be viewed as a measure of how vital a fact is to an understanding of the entity associated with the object.

Each fact 204 includes a list of one or more sources 220 that include the fact and from which the fact was extracted. Each source may be identified by a URL, or Web address, or any other appropriate form of identification and/or location, such as a unique document identifier.

The facts illustrated in FIG. 2(d) include an agent field 222 that identifies the importer 108 that extracted the fact. For example, the importer 108 may be a specialized importer that extracts facts from a specific source (e.g., the pages of a particular web site, or family of web sites) or type of source (e.g., web pages that present factual information in tabular form), or an importer 108 that extracts facts from free text in documents throughout the Web, and so forth.

Some embodiments include one or more specialized facts, such as a name fact 207 and a property fact 208. A name fact 207 is a fact that conveys a name for the entity associated with the object in which the fact is included. A name fact 207 includes an attribute 224 of "name" and a value, which is the name of the associated entity. For example, for an object associated with country Spain, a name fact would have the value "Spain." A name fact 207, being a special instance of a general fact 204, includes the same fields as any other fact 204; it has an attribute, a value, a fact ID, metrics, sources, etc. The attribute 224 of a name fact 207 indicates that the fact is a name fact, and the value is the actual name. The name may be a string of characters. An object may have one or more associated name facts, as many entities can have more than one name. For example, an object associated with Spain may have associated name facts conveying the country's common name "Spain" and the official name "Kingdom of Spain." As another example, an object associated with the U.S. Patent and Trademark Office may have associated name facts conveying the agency's acronyms "PTO" and "USPTO" as well as the official name "United States Patent and Trademark Office." If an object does have more than one associated name fact, one of the name facts may be designated as a primary name and other name facts may be designated as secondary names, either implicitly or explicitly. The name facts associated with an object are also called synonymous names of the object.

A property fact 208 is a fact that conveys a statement about the entity associated with the object. Property facts are generally used for summary information about an object. A property fact 208, being a special instance of a general fact 204, also includes the same fields (such as attribute, value, fact ID, etc.) as other facts 204. The attribute field 226 of a property fact 208 indicates that the fact is a property fact (e.g., attribute is "property") and the value is a string of text that conveys the statement of interest. For example, for the object associated with Bill Clinton, the value of a property fact may be the text string "Bill Clinton was the 42nd President of the United States from 1993 to 2001." Some objects may have one or more associated property facts while other objects may have no associated property facts. It should be appreciated that the data structures shown in FIGS. 2(a)-2(d) and described above are merely exemplary. The data structure of the repository 115 may take on other forms. Other fields may be included in facts and some of the fields described above may be omitted. Additionally, each object may have additional special facts aside from name facts and property facts, such as facts conveying a type or category (for example, person, place, movie, actor, organization, etc.) for categorizing the entity associated with the object. In some embodiments, an object's name(s) and/or properties may be represented by special records that have a different format than the general fact records 204.

As described previously, a collection of facts is associated with an object ID of an object. An object may become a null or empty object when facts are disassociated from the object. A null object can arise in a number of different ways. One type of null object is an object that has had all of its facts (including name facts) removed, leaving no facts associated with its object ID. Another type of null object is an object that has all of its associated facts other than name facts removed, leaving only its name fact(s). Alternatively, the object may be a null object only if all of its associated name facts are removed. A null object represents an entity or concept for which the data processing system 106 has no factual information and, as far as the data processing system 106 is concerned, does not exist. In some embodiments, facts of a null object may be left in the repository 115, but have their object ID values cleared (or have their importance set to a negative value). However, the facts of the null object are treated as if they were removed from the repository 115. In some other embodiments, facts of null objects are physically removed from the repository 115.

Figure 2E:
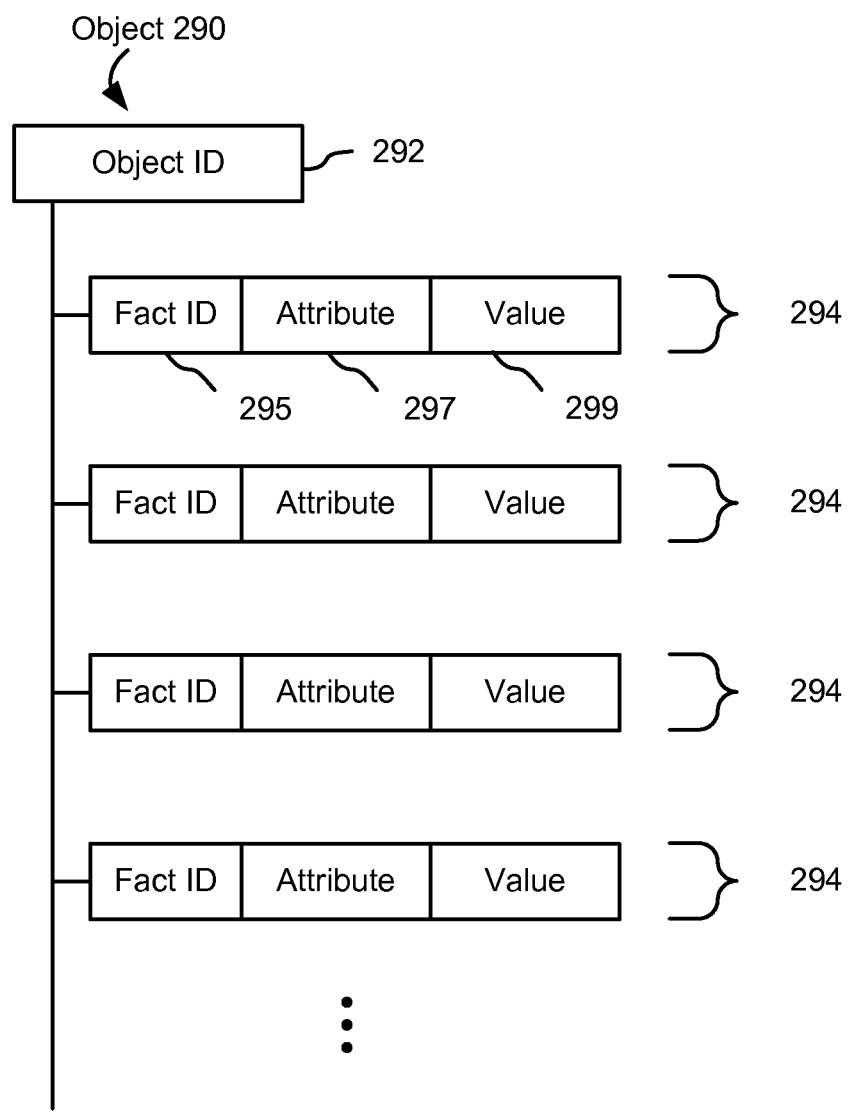
FIG. 2(e) is a block diagram illustrating an embodiment of an alternative data structure for facts and objects.

FIG. 2(e) is a block diagram illustrating an alternate data structure 290 for facts and objects in accordance with embodiments of the invention. In this data structure, an object 290 contains an object ID 292 and references or points to facts 294. Each fact includes a fact ID 295, an attribute 297, and a value 299. In this embodiment, an object 290 actually exists in memory 107.

As described above, an object may explicitly exist in the repository 115, or it may exist merely as a collection of facts with a common object ID. Reference is made to particular objects for the purposes of illustration; one of skill in the art will recognize that the systems and methods described herein are applicable to a variety of implementations and that such references are not limiting. When reference is made to a fact being associated with an object, it should be understood that in at least one embodiment a fact is associated with an object by sharing a common object ID with other facts. For example, a fact could be associated with an object of a given type by sharing a common object ID at least with a type fact indicating the given type (or as another example, with a category fact indicating a particular category of object). Furthermore, in various embodiments, facts and objects can be stored in a variety of structures, such as fact and/or object repositories. When reference is made herein to the repository 115, it should be understood that various embodiments may store facts and/or objects in a variety of data structures.

Overview of Methodology

Figure 3:
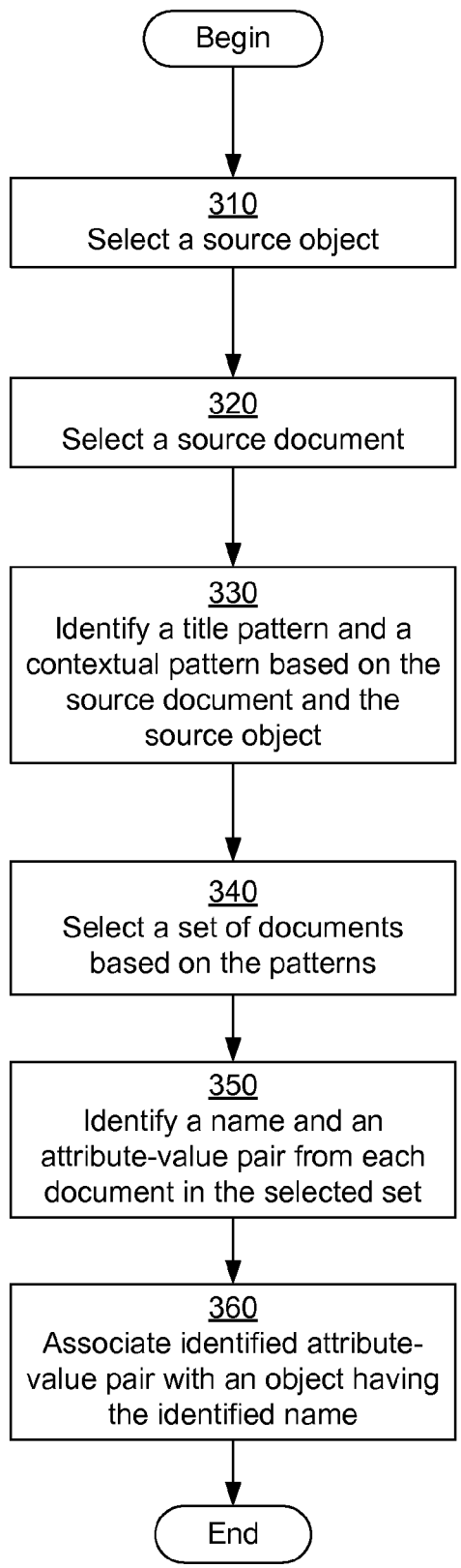
FIG. 3 is a flowchart of an exemplary method for learning objects and facts from a plurality of documents in accordance with one embodiment.

Referring now to FIG. 3, there is shown a flow diagram illustrating a method 300 for learning (or extracting) objects and facts from a plurality of documents in accordance with one embodiment. Other embodiments perform steps of the method 300 in different orders and/or perform different or additional steps than the ones shown in FIG. 3. The steps of the process illustrated in FIG. 3 may be implemented in software, hardware, or a combination of hardware and software.

In one embodiment, the steps of the method 300 may be performed by one or more importers 108 as shown in FIG. 1, although one skilled in the art will recognize that the method could be performed by systems having different architectures as well. The importers 108 can perform multiple instances of the steps of the method 300 concurrently and/or perform steps in parallel.

The flowchart shown in FIG. 3 will now be described in detail. The process commences with a plurality of objects and a plurality of documents. The plurality of objects can be objects in the fact repository 115. The plurality of documents can be documents in the document hosts 102.

As described above in relation to FIGS. 2(a)-2(e), an object is associated with one or more facts. Each fact has an attribute and a value (hereinafter called an "attribute-value pair"). For example, an object representing Canada can have a fact with an attribute "name" and a value of the attribute "Canada". A fact with the attribute "name" is called a name fact, and its value is called an object name. The object representing Canada can also have a fact with an attribute-value pair of "Capital-Ottawa", wherein "Capital" is the attribute and "Ottawa" is the value.

As described above, a document may be encoded in a markup language, such as the Hypertext Markup Language (HTML), i.e., a web page, in an interpreted language (e.g., JavaScript) or in any other computer readable or executable format. A document can have one or more titles. One example is a web page encoded in HTML with content about the first President of the United States, George Washington.

The importer 108 selects 310 a source object from the plurality of objects. In one embodiment, the importer 108 gives priority to objects associated with more facts when selecting 310 the source object. In another embodiment, each of the plurality of objects has equal chance of being selected 310.

The importer 108 selects 320 a source document associated with a fact of the source object from the plurality of documents. As described above in relation to FIG. 2(d), each fact includes a list of sources 220 from which the fact was extracted. In one embodiment, the importer 108 selects 320 the source document from sources of a fact associated with the source object. In one embodiment, the importer 108 gives priority to documents from reputable websites (e.g., the Encyclopedia Britannica Online) when selecting 320 the source document.

Alternatively, the importer 108 searches for documents containing an object name of the source object and one or more of its facts (or attribute-value pairs) in the plurality of documents. The importer 108 then selects 320 the source document from the search result. For example, for an object with object name "China" and attribute-value pair "Capital-Beijing," the importer 108 can search for documents containing "China," "Capital," and "Beijing." The importer 108 may specify search criteria such as whether the object name matches document titles and whether the rest of the search terms match document contents. The search may be performed using a search engine, such as a Web search engine.

The importer 108 identifies 330 a title pattern and a contextual pattern based on the source document and the source object. The title pattern is intended to reflect a relationship between a title of the source document (hereinafter called "the document title") and the object name of the source object ("the source object name"). In one embodiment, the importer 108 determines whether the document title contains the source object name as a substring. A substring is a contiguous sequence of characters taken from a string. If the document title does not contain the source object name as a substring, the importer 108 repeats the above process and selects 320 another document as the source document.

The importer 108 identifies 330 the title pattern by comparing the document title with the source object name. In one embodiment, a title pattern comprises a prefix section, a body section, and a suffix section. A title pattern can be expressed as "%[PREFIX SECTION]% && %[SUFFIX SECTION]%", where "&&" represents the source object name. For example, the title pattern of a document title "Summary for Microsoft CP—Yahoo! Finance" and an object name "Microsoft CP" is "%Summary for% && %—Yahoo! Finance%". In this example, the prefix section is "Summary for" and the suffix section is "—Yahoo! Finance". The body section of the document title is the same as the object name, "Microsoft CP."

The contextual pattern is a structural pattern in which the source document displays (or presents) facts (or attribute-value pairs). For example, a document can display facts of an object in a table (the contextual pattern) such that the attribute-value pair for a fact appears in the same row. In one embodiment, the importer 108 identifies 330 the contextual pattern by identifying language markups (e.g., HTML markups (or tags)) that define the structural pattern. For example, a web page may contain a list of attributes and values with HTML markup as the following:

. . .
    <title> China—Country Facts </title>
    . . .
    <table border="1">
    <tr> <td> Population </td> <td> 1.3 billion </td> </tr>
    <tr> <td> Capital </td> <td> Beijing </td> </tr>
    <tr> <td> Largest City </td> <td> Shanghai </td> </tr>
    </table>
    . . .

The above web page contains facts about China such as that its capital is Beijing. The HTML markups indicate that the facts should be presented in a table format (e.g., by a web browser).

The importer 108 can identify 330 the contextual pattern in the source document by matching attribute-value pairs of the source object with content of the source document. The contextual pattern contains the HTML markup (or tag) sequence associated with the matching attribute-value. For example, for an attribute-value pair "Capital-Beijing," the importer 108 may identify 330 the following contextual pattern in the above web page: "<tr> <td> $$ </td> <td> ££ </td> </tr>". In this example, "$$" indicates a text block for an attribute and "££" indicates a text block of a corresponding value. The importer 108 may identify 330 multiple contextual patterns in a source document, with each pattern corresponding with a fact of the source object.

Figure 4:
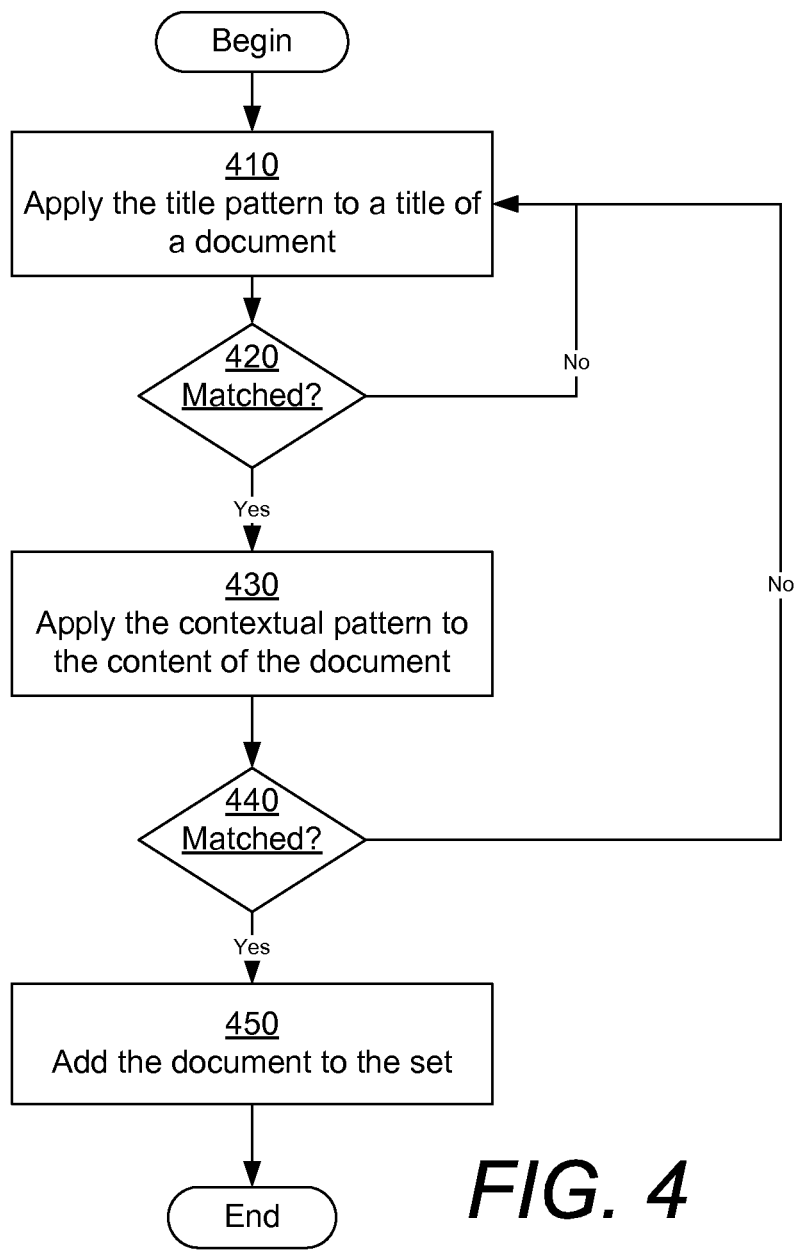
FIG. 4 is a flowchart illustrating a process to identify a set of documents matching a title pattern and a contextual pattern in accordance with one embodiment.

The importer 108 selects 340 a set of documents from the plurality of documents based on the title pattern and the contextual pattern. One embodiment of the process for the importer 108 to select 340 the set of documents is further illustrated in the flowchart shown in FIG. 4. For each of the plurality of documents, the importer 108 starts the process by applying 410 the title pattern to a title of the document. If the importer 108 determines 420 that the title does not match the title pattern, it determines that the document should not be added to the set and repeats the process for the next document. Otherwise, the importer 108 applies 430 the contextual pattern to the content of the document. If the importer 108 determines 440 that there is no match for the contextual pattern, it determines that the document should not be added to the set and repeats the process for the next document. If a title of the document matches the title pattern and the content of the document matches the contextual pattern, the importer 108 adds 450 the document to the set.

In one embodiment, the importer 108 only examines documents within the same domain as the source document when selecting 340 the set of documents. A domain is a group of computers and devices that share a common part of an Internet Protocol (IP) address that identifies (or locates) an organization (or entity) on the Internet. All documents from computers and devices in the group are said to be from the same domain. Documents from the same domain may be stored in one or multiple document hosts 102. The set of documents can include the source document.

Limiting the set of documents to be within the same domain as the source document can be advantageous, especially when the size of the plurality of documents is large. The computational cost of comparing documents with the title pattern and the contextual pattern can become unmanageable as the number of documents grows. Also, because documents within the same domain as the source document are more likely to share the same style as the source document, they are more likely to match the title pattern and the contextual pattern than documents from other domains.

As described above, the importer 108 can identify 330 multiple contextual patterns. In one embodiment, the importer 108 adds 450 a document into the set of documents as long as the document matches the title pattern and any one of the multiple contextual patterns. In another embodiment, the importer 108 adds 450 a document into the set only when the document matches the title pattern and all of the identified contextual patterns.

Referring back to FIG. 3, for each document in the selected set, the importer 108 identifies 350 a name and one or more attribute-value pairs from the document. The importer 108 identifies 350 the name by applying the title pattern to the title of the document. The importer 108 identifies 350 one or more attribute-value pairs by applying the contextual pattern to the content of the document.

The identified name tends to be an object name for an object (or entity) described in the document. As described above, the source document contains facts of the source object, and therefore describes the source object. Further, the source object name can be extracted from a title of the source document using the title pattern. Because the title pattern also matches titles of the documents in the selected set, it follows that these documents tend to follow a consistent naming convention (or protocol or standard). For example, titles of web pages containing company profile in Yahoo! finance website follow a common pattern of "%COMPANY NAME% Company Profile—Yahoo! Finance". Therefore, the name identified by applying the title pattern to a title of the document tends to be an object name for an object described in the document.

Similarly, the identified attribute-value pairs tend to be facts for the object described in the document. As described above, the source document contains facts of the source object matching the contextual pattern. Same as the source document, documents in the selected set match the title pattern and the contextual pattern. Therefore, these documents tend to share a style or format (e.g., displaying facts in a table or list). Because facts of the source object can be extracted from the source document using the contextual pattern, it follows that the attribute-value pairs identified by applying the contextual pattern to content of the document tend to be facts for the object described in the document.

The importer 108 can repeatedly apply the contextual pattern to content of the document to identify 350 (or extract or learn) attribute-value pairs. For example, if the contextual pattern identifies a table entry, the importer 108 may extract attribute-value pairs from that table entry and nearby table entries that match the contextual pattern. In one embodiment, the importer 108 extracts attribute-value pairs that are proximate to each other. By applying such a limitation, the importer 108 can be sure that the identified attribute-value pairs are likely from the same structure (e.g., the same table or list). Alternatively, the importer 108 can parse the document to identify 350 attribute-value pairs from all structures that match the contextual pattern.

In one embodiment, the importer 108 examines the quality of the identified attribute-value pairs by matching their attributes with a group of valid attributes (called "a white attribute list"). The identified contextual pattern may be general (e.g., a table row, a list item), and therefore the attribute-value pairs identified by applying the general contextual pattern may be over-inclusive. If the match fails to meet a certain threshold value (percentage or absolute value), the importer 108 determines that the identified attribute-value pairs are low in quality, and may disregard them entirely or only keep those that match. The white attribute list may include attributes identified in the source document and/or attributes collected from other sources (e.g., compiled by human editors). Similarly, the importer 108 may match the identified attribute-value pairs with a group of invalid attributes (called "a black attribute list"), and disregard them if the match exceeds a certain threshold value.

For each document in the selected set, the importer 108 associates 360 the attribute-value pairs identified in the document with an object with the identified name. In one embodiment, the importer 108 creates a new object, assigns the new object with the identified name, and associates 360 it with the identified attribute-value pairs. The importer 108 then passes the newly created object to a janitor 110 to incorporate the object into the fact repository 115. In one embodiment, the janitor 110 searches in the fact repository 115 for an object associated with the identified name. If no such object exists, the janitor 110 adds the newly created object into the fact repository 115. Otherwise, the janitor 110 merges the newly created object with the existing object in the fact repository 115. If the janitor 110 determines that the existing object does not contain some of the attribute-value pairs identified in the document, it adds these attribute-value pairs into the fact repository 115 and associates 360 them with the existing object. If the existing object and the newly created object contain duplicated attribute-value pairs (e.g., same attribute and same value), the janitor 110 can optionally add the document as a source of this fact of the existing object. If the existing object and the newly created object contain inconsistent attribute-value pairs (e.g., same attribute but different value), the janitor 110 can determine a confidence value for each of the attribute-value pairs, and set the one with higher value as the value of the fact for the existing object. In other embodiments, the importer 108 only creates a new object if no object associated with the identified name is located in the fact repository 115.

In one embodiment, the fact repository 115 can have objects associated with the same object name (or name fact value). For example, two objects can both have the name "New York," one representing the New York City and the other representing a movie with the title "New York." In order to locate the right object as described in the document, and not an object that happens to share the same object name, the janitor 110 searches in the fact repository 115 for an object associated with the identified name and at least one identified attribute-value pair, and merges the newly created object with the object found in the manner detailed above.

It is noted that in alternative embodiments, the importer 108 (or the janitor 110) may apply some normalization rules to the identified names to standardize its format before identifying corresponding objects. The importer 108 may also apply these normalization rules to the identified attribute-value pairs before associating 360 them with objects. Examples of the normalization rules include removal of punctuation, such as removing commas in a string, conversion of uppercase characters in a string to corresponding lowercase characters, such as from "America" to "america," and stop word removal, such as removing stop words such as "the" and "of" from a string. For example, after applying the above normalization rules, an object name of "Charles Chaplin" becomes "charles chaplin".

In one embodiment, the importer 108 (or the janitor 110) compares the identified names with content of a black list. The black list contains texts that are not entity names (e.g., adjectives such as "beautiful", and stop words such as "the"). Therefore, if there are matches between the identified name and the black list, the importer 108 determines that this name is not a valid entity name, and therefore does not create an object for it.

In one embodiment, the importer 108 (or the janitor 110) compares the learned object names with content of a white list. The white list contains some entity names (e.g., "United Nation," "John Lennon"). The white list can be compiled by human editors or extracted from reputable sources (e.g., the Encyclopedia Britannica Online). Therefore, if there are matches between the identified name and the white list, the importer 108 determines that the identified name is a proper object name.

The importer 108 can repeat the process described above for a different source object and/or a different source document. As a result, the importer 108 can learn objects and associated facts from the plurality of documents.

Example Process

The method 300 is further illustrated by an example shown in FIG. 5. As illustrated in FIG. 5, an object O1 has an attribute-value pair of "name-George Washington," and an attribute-value pair of "Born-Feb. 22, 1732." The source of both facts (or attribute-pairs) is "http://en.wikipedia.org/wiki/George_washington."

FIG. 5 also shows a plurality of documents D1-D5. Documents D1-D5 are all from Wikipedia.org domain 501. Document D1 (hereinafter called "D1") is entitled "George Washington—Wikipedia, the free encyclopedia." Content of D1 includes the following structured text:

| Born | Feb. 22, 1732 |
| Died | Dec. 14, 1799 |
| Spouse | Martha Dandridge Custis Washington |

Document D2 ("D2") is entitled "Canada—Wikipedia, the free encyclopedia." Content of D2 includes the following structured text:

| Capital | Ottawa |
| Area | 9,984,670 km$^2$ |
| GDP | $1.105 trillion |

Document D3 ("D3") is entitled "Help:Contents—Wikipedia, the free encyclopedia" and does not contain text structured as displayed above. Document D4 ("D4") is entitled "Isaac Asimov—Wikipedia, the free encyclopedia." Content of D4 includes the following structured text:

| Born | Jan. 2, 1920 |
|---|---|
| Died | Apr. 6, 1992 |

Document D5 ("D5") is entitled "Fundraising—Wikimedia Foundation" and does not contain text structured as displayed above.

Content of documents D1-D5 can be organized in HTML structures such as tables and lists in order to be displayed as structured text as illustrated in FIG. 5. For example, the HTML source code of D1 may contain the following:

. . .
<title> George Washington—Wikipedia, the free encyclopedia
</title>
. . .
<li> <b> Born </b> Feb. 22, 1732</li>
<li> <b> Died </b> Dec. 14, 1799</li>
<li> <b> Spouse </b> Martha Dandridge Custis Washington </li>
. . .

As shown above, content of D1 is organized as a list, and thus appears as structured text to viewers.

The importer 108 selects 310 object O1 as the source object. Because the source of both facts associated with O1 is "http://en.wikipedia.org/wiki/George_washington," the URL of D1, the importer 108 selects 320 D1 as the source document.

The importer 108 identifies 330 a title pattern by comparing the title of the source document D1 ("George Washington—Wikipedia, the free encyclopedia") with the object name of the source object O1 ("George Washington"). The importer 108 determines that the prefix section of the title pattern is empty and the suffix section is "—Wikipedia, the free encyclopedia". Therefore, the identified title pattern is "%% && %—Wikipedia, the free encyclopedia %".

The importer 108 identifies 330 a contextual pattern by matching an attribute-value pair of the source object O1 (Born-Feb. 22, 1732) with the content of the source document D1 (" . . . <li><b> Born </b> Feb. 22, 1732 </li> . . . "). The importer 108 identifies 330 the following contextual pattern: "<li><b>$$</b>££</li>".

The importer 108 selects 340 a set of documents based on the identified title pattern ("%% && %—Wikipedia, the free encyclopedia %") and the identified contextual pattern ("<li><b>$$</b>££</li>"). The importer 108 applies 410 the title pattern to titles of D1-D5 and determines 420 that titles of D1-D4 match with the title pattern. The importer 108 applies 430 the contextual pattern to contents of D1-D4, and determines 440 that the contents of D1, D2, and D4 match with the contextual pattern. As a result, the importer 108 adds 450 D1, D2, and D4 to the selected set of documents. It is noted that the selected set includes the source document D1.

The importer 108 applies the identified title pattern ("%% && %—Wikipedia, the free encyclopedia %") and contextual pattern ("<li><b>$$</b>££</li>") to each document in the selected set (D1, D2, and D4) to identify 350 names and attribute-value pairs. For D1, the importer 108 identifies 350 the name "George Washington" and attribute value pairs "Born-Feb. 22, 1732," "Died-Dec. 14, 1799," and "Spouse-Martha Dandridge Custis Washington." For D2, the importer 108 identifies the name "Canada" and attribute-value pairs "Capital-Ottawa," "Area-9,984,670 km2," and "GDP-$1.105 trillion." Similarly, for D4, the importer 108 identifies the name "Isaac Asimov" and attribute-value pairs "Born-Jan. 2, 1920" and "Died-Apr. 6, 1992."

The importer 108 (or the janitor 110) identifies (or creates) objects with the identified names and associates 360 the identified attribute-value pairs with the objects. For D1, because O1 is already associated with the attribute-value pair "Born-Feb. 22, 1732," the importer 108 (or the janitor 110) associates 360 the attribute-value pairs "Died-Dec. 14, 1799" and "Spouse-Martha Dandridge Custis Washington" with O1 and adds D1 as their source. For D2, the importer 108 (or the janitor 110) creates an object with object name "Canada," associates 360 it with attribute-value pairs "Capital-Ottawa," "Area-9,984,670 km2," and "GDP-$1.105 trillion," and adds D2 as their source. Similarly, for D4, the importer 108 (or the janitor 110) creates an object with object name "Isaac Asimov," associates 360 it with attribute-value pairs "Born-Jan. 2, 1920" and "Died-Apr. 6, 1992," and adds D4 as their source.

Alternative Embodiments

In one embodiment, instead of selecting 320 a source document based on facts of the identified source object, the importer 108 can first select a source document and then select a source object based on the subject of the source document. For example, the importer 108 can first identify a title pattern of the selected source document, determine an object name based on the document title and the title pattern, and select a source object associated with the object name. The importer 108 can then identify 330 a contextual pattern as described above. If the importer 108 fails to select such a source object or fails to identify 330 a contextual pattern, it can repeat the process and select a different source document.

The importer 108 can identify a title pattern of the source document by analyzing the document title of the source document and anchor texts of documents linking to the source document. Detailed description and embodiments of identifying a title pattern for the source document can be found in U.S. patent application Ser. No. 11/394,610, entitled "Determining Document Subject by Using Title and Anchor Text of Related Documents," filed on Mar. 31, 2006, the disclosure of which is hereby incorporated by reference in its entirety.

It is noted that the importer 108 can identify 330 more than one contextual pattern for the source document and the source object. For example, some of the attribute-value pairs may be in a list in the source document, and others may be in a table in the source document. In some embodiments, the importer 108 can select 340 a set of documents for each of the identified contextual patterns.

It should be appreciated that the process described above may be performed at another time for other purposes, such as learning images and other media data from semi-structured text and verifying the quality of the plurality of documents. The process may be performed as needed or at scheduled intervals. Furthermore, the process may be performed for other objects in the fact repository 115.

Reference in the specification to "one embodiment" or to "an embodiment" means that a particular feature, structure, or characteristic described in connection with the embodiments is included in at least one embodiment of the invention. The appearances of the phrase "in one embodiment" in various places in the specification are not necessarily all referring to the same embodiment.

Some portions of the above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "determining" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention can be embodied in software, firmware or hardware, and when embodied in software, can be downloaded to reside on and be operated from different platforms used by a variety of operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the present invention as described herein, and any references below to specific languages are provided for disclosure of enablement and best mode of the present invention.

While the invention has been particularly shown and described with reference to a preferred embodiment and several alternate embodiments, it will be understood by persons skilled in the relevant art that various changes in form and details can be made therein without departing from the spirit and scope of the invention.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

What is claimed is:

1. A method for learning objects and facts from documents, comprising:
   on a computer system having one or more processors and memory storing one or more programs for execution by the one or more processors, without user intervention:
      selecting a source object from a plurality of objects stored in a fact repository, the source object having an object name and an attribute-value pair;
      selecting a source document from a plurality of documents based on a determination that
         a title of the source document includes the object name of the source object; and
         content of the source document includes an attribute and a value related to the attribute-value pair of the source object;
      identifying a title pattern for the title of the source document based on a first syntax of (i) the title of the source document, and (ii) the object name of the source object within the title of the source document;
      identifying a contextual pattern for the content of the source document based on a second syntax of (i) the attribute and (ii) the value related to the attribute-value pair of the source object, the contextual pattern being a structural pattern in which one or more attribute-value pairs, including the attribute-value pair of the source object, are presented;
      selecting a second document from the plurality of documents based on a determination that (i) the contextual pattern is found in the second document and (ii) a title of the second document matches the title pattern;
      identifying a new object name and a new attribute-value pair from the second document by applying the title pattern and the contextual pattern identified from the source document to the second document; and
      storing into the fact repository the new attribute-value pair and a new object having the new object name.

2. The method of claim 1, wherein the first syntax specifies a first sequence of symbols and non-symbol characters that identifies the object name within the title of the source document.

3. The method of claim 1, wherein selecting the source document from the plurality of documents further comprises selecting a source of the attribute-value pair of the source object as the source document.

4. The method of claim 1, wherein selecting the source document from the plurality of documents further comprises:
   obtaining a search result including documents containing the object name and the attribute-value pair of the source object; and
   selecting the source document from the search result.

5. The method of claim 1, wherein selecting the second document further comprises selecting a set of documents from the plurality of documents, each document in the selected set matching the title pattern and the contextual pattern, the method further comprising:

repeating the operation of identifying the new object name and the new attribute-value pair for each of the documents in the selected set.

6. The method of claim 5, wherein the documents in the selected set are from a same domain as the source document.

7. The method of claim 5, wherein the documents in the selected set include the source document.

8. The method of claim 1, wherein identifying the new object name and the new attribute-value pair further comprises:

matching an attribute of the new attribute-value pair with a white attribute list;

responsive to a match, determining that the new attribute-value pair is a valid attribute-value pair; and responsive to no match, determining that the new attribute-value pair is an invalid attribute-value pair.

9. The method of claim 1, wherein storing the new attribute-value pair and the new object having the new object name further comprises:

identifying the new object associated with the new object name; and associating the new attribute-value pair with the new object.

10. The method of claim 9, wherein identifying the new object associated with the new object name comprises:

responsive to an existing object comprising the new object name, identifying the existing object as the new object; and responsive to no existing object comprising the new object name:

creating an object, assigning the new object name to the object, and identifying the object as the new object.

11. The method of claim 1, wherein the plurality of documents comprise a web page.

12. The method of claim 1, wherein the source document and the second document share (i) a same title pattern for their respective title, and (ii) a same contextual pattern for their respective content.

13. The method of claim 1, wherein title of the source document includes (i) a prefix section, (ii) the object name of the source object, and (iii) a suffix section; and identifying the title pattern for the title of the source document based on structural arrangement the object name of the source object includes:

identifying the title pattern for the title of the source document based on structural arrangement of (i) the prefix section, (ii) the object name of the source object, and (iii) the suffix section within the title of the source document.

14. The method of claim 1, wherein identifying the title pattern for the title of the source document based on structural arrangement the object name of the source object includes:

identifying, within the title of the source document, a substring corresponding to the object name of the source object; and determining, position of the substring relative to one or more other strings in the title of the source document.

15. A system for learning objects and facts from document, the system comprising:

a processor;

memory; and one or more programs for execution by the processor, wherein the one or more programs including instructions for, without user intervention:

selecting a source object from a plurality of objects stored in a fact repository, the source object having an object name and an attribute-value pair;

selecting a source document from a plurality of documents based on a determination that a title of the source document includes the object name of the source object; and content of the source document includes an attribute and a value related to the attribute-value pair of the source object;

identifying a title pattern for the title of the source document based on a first syntax of (i) the title of the source document, and (ii) the object name of the source object within the title of the source document;

identifying a contextual pattern for the content of the source document based on a second syntax of (i) the attribute and (ii) the value related to the attribute-value pair of the source object, the contextual pattern being a structural pattern in which one or more attribute-value pairs, including the attribute-value pair of the source object, are presented;

selecting a second document from the plurality of documents based on a determination that (i) the contextual pattern is found in the second document and (ii) a title of the second document matches the title pattern;

identifying a new object name and a new attribute-value pair from the second document by applying the title pattern and the contextual pattern identified from the source document to the second document; and storing into the fact repository the new attribute-value pair and a new object having the new object name.

16. The system of claim 15, wherein the first syntax specifies a first sequence of symbols and non-symbol characters that identifies the object name within the title of the source document.

17. The system of claim 15, wherein selecting the second document further comprises selecting a set of documents from the plurality of documents, each document in the selected set matching the title pattern and the contextual pattern, the method further comprising:

repeating the operation of identifying the new object name and the new attribute-value pair for each of the documents in the selected set.

18. A non-transitory computer readable storage medium storing one or more programs configured for execution by a computer, the one or more programs comprising instructions for, without user intervention:

selecting a source object from a plurality of objects stored in a fact repository, the source object having an object name and an attribute-value pair;

selecting a source document from a plurality of documents based on a determination that a title of the source document includes the object name of the source object; and content of the source document includes an attribute and a value related to the attribute-value pair of the source object;

identifying a title pattern for the title of the source document based on a first syntax of (i) the title of the source document, and (ii) the object name of the source object within the title of the source document;

identifying a contextual pattern for the content of the source document based on a second syntax of (i) the attribute and (ii) the value related to the attribute-value pair of the source object, the contextual pattern being a structural pattern in which one or more attribute-value pairs, including the attribute-value pair of the source object, are presented;

selecting a second document from the plurality of documents based on a determination that (i) the contextual pattern is found in the second document and (ii) a title of the second document matches the title pattern;

identifying a new object name and a new attribute-value pair from the second document by applying the title pattern and the contextual pattern identified from the source document to the second document; and storing into the fact repository the new attribute-value pair and a new object having the new object name.

19. The non-transitory computer readable storage medium of claim 18, wherein the first syntax specifies a first sequence of symbols and non-symbol characters that identifies the object name within the title of the source document.

20. The non-transitory computer readable storage medium of claim 18, wherein the instructions for selecting the second document further comprises instructions for selecting a set of documents from the plurality of documents, each document in the selected set matching the title pattern and the contextual pattern, the one or more computer programs further comprising:

instructions for repeating the operation of identifying the new object name and the new attribute-value pair for each of the documents in the selected set.

* * * * *